United States Patent
Watts et al.

(10) Patent No.: US 11,983,020 B2
(45) Date of Patent: May 14, 2024

(54) MODULAR VEHICLE CONFIGURATION MANAGEMENT SYSTEM AND METHODS

(71) Applicants: Brian Watts, Timonium, MD (US); Caleb Pinckney, Chapin, SC (US); Thomas Charles Lauzon, Washington, DC (US); Jacob Dahl, Anchorage, AK (US); Graham Newton, Washington, DC (US)

(72) Inventors: Brian Watts, Timonium, MD (US); Caleb Pinckney, Chapin, SC (US); Thomas Charles Lauzon, Washington, DC (US); Jacob Dahl, Anchorage, AK (US); Graham Newton, Washington, DC (US)

(73) Assignee: Watts Innovations, Inc., Hunt Valley, MD (US)

( * ) Notice: Subject to any disclaimer, the term of this patent is extended or adjusted under 35 U.S.C. 154(b) by 161 days.

(21) Appl. No.: 17/326,319

(22) Filed: May 20, 2021

(65) Prior Publication Data
US 2022/0374027 A1    Nov. 24, 2022

(51) Int. Cl.
G05D 1/10      (2006.01)
B64C 39/02    (2023.01)
(Continued)

(52) U.S. Cl.
CPC ........... G05D 1/101 (2013.01); B64C 39/024 (2013.01); G05D 1/0016 (2013.01);
(Continued)

(58) Field of Classification Search
CPC .... G05D 1/101; G05D 1/0016; G05D 1/0022; B64C 39/024; B64C 2211/00;
(Continued)

(56) References Cited

U.S. PATENT DOCUMENTS 9,348,333 B1 * 5/2016 Buchmueller ........ B64C 39/024
9,688,403 B2    6/2017 Winn
(Continued)

FOREIGN PATENT DOCUMENTS

GB        2573536 A * 11/2019 ........... B64C 39/024

OTHER PUBLICATIONS

Autopilot Inputs and Outputs, https://ardupilot.org/copter/docs/common-flight-controller-io.html.
(Continued)

*Primary Examiner* — Anne Marie Antonucci
*Assistant Examiner* — Patrick Daniel Mohl

(57) ABSTRACT

An automated modular vehicle configuration system and method that comprises a Configuration Management Unit in the vehicle that detects assemblies attached to the vehicle and configures the vehicle's autopilot based on the detected assemblies. Each attached assembly comprises mechanical and electrical components, ports and a memory device that contains identification information and data related to the assembly, such as assembly type, propulsion type, position, flight time, manufacturing date. Users can swap assemblies on the vehicle in order to provide different features to the vehicle. In particular this invention relates to drone vehicles that can be configured with different types of propulsion systems with different performance profiles and equipment such as gimbals, cameras, landing gear, measurement payloads and such. The invention also automatically downloads vehicle configuration parameters and autopilot firmware updates. Vehicle configuration and logs can be sent to the cloud for safekeeping and further analysis.

31 Claims, 26 Drawing Sheets

(51) Int. Cl.
G05D 1/00 (2006.01)
G06F 3/0482 (2013.01)
G06F 8/65 (2018.01)
G07C 5/00 (2006.01)
G07C 5/08 (2006.01)
H04W 4/40 (2018.01)

(52) U.S. Cl.
CPC ......... *G05D 1/0022* (2013.01); *G06F 3/0482* (2013.01); *G06F 8/65* (2013.01); *G07C 5/008* (2013.01); *G07C 5/0808* (2013.01); *H04W 4/40* (2018.02); *B64C 2211/00* (2013.01); *B64U 2201/20* (2023.01)

(58) Field of Classification Search
CPC ......... G06F 3/0482; G06F 8/65; G06F 8/654; G06F 8/71; G07C 5/008; G07C 5/0808; H04W 4/40; B64U 2201/20
See application file for complete search history.

(56) References Cited

U.S. PATENT DOCUMENTS

| | | | |
|---|---|---|---|
| 9,816,897 B2 | 11/2017 | Ziarno | |
| 9,902,491 B2 | 2/2018 | Chan | |
| 10,435,143 B1 | 10/2019 | O'Brien | |
| 10,988,253 B2 | 4/2021 | Perry | |
| 2005/0024195 A1 | 2/2005 | Bai | |
| 2007/0114280 A1 | 5/2007 | Coop | |
| 2008/0061153 A1 | 3/2008 | Hickle | |
| 2014/0009561 A1* | 1/2014 | Sutherland | B62D 11/04 348/14.05 |
| 2017/0021946 A1* | 1/2017 | Weller | G06F 3/00 |
| 2017/0288976 A1* | 10/2017 | Wang | H04L 41/12 |
| 2019/0135403 A1 | 5/2019 | Perry | |
| 2019/0152597 A1* | 5/2019 | Van Niekerk | G05D 1/101 |
| 2019/0265694 A1 | 8/2019 | Chen | |
| 2021/0339860 A1* | 11/2021 | Agostino | B64D 27/02 |

OTHER PUBLICATIONS

Professional Aviation Record Keeping and Analysis, https://www.zululog.com/overview/ZuluProfessional.jsp?zadr=GMaintTkgA&gclid=CjwKCAiA4Y7yBRB8EiwADV1haXWdePeYfjNXIXBLB4dqRcv7YcR31LmjoHZlji2e1sUEAiBRFSE_DBoCjOAQAvD_BwE.

Industry Challenges, https://www.bradyid.com/software/smartid/aerospace-industry.

Boeing to Introduce RFID-Based Parts Tracking, https://www.ainonline.com/aviation-news/air-transport/2012-01-03/boeing-introduce-rfid-based-parts-tracking.

R.P.A.S Flight Manual, Watts Innovations, dated Dec. 2020, published Jan. 2021, Inventor disclosure after provisional application and within grace period of non-provisional application.

* cited by examiner

Fig. 2  Quadcopter configuration

Propulsion Assembly

Assembly

| Pin | Top or bottom | Port | Motor Number | Assembly ID |
|---|---|---|---|---|
| 1 | Top | 1 | 3 | wwww |
| 3 | Top | 3 | 2 | xxxx |
| 5 | Top | 4 | 4 | yyyy |
| 7 | Top | 2 | 1 | zzzz |

Fig. 7

| Pin | Top or bottom | Port | Motor Number | Assembly ID |
|---|---|---|---|---|
| 1 | Top | 1 | 2 | wwww |
| 2 | Bottom | 1 | 5 | wwww |
| 3 | Top | 3 | 3 | xxxx |
| 4 | Bottom | 3 | 8 | xxxx |
| 5 | Top | 4 | 4 | yyyy |
| 6 | Bottom | 4 | 7 | yyyy |
| 7 | Top | 2 | 1 | zzzz |
| 8 | Bottom | 2 | 6 | zzzz |

Fig. 8

Fig. 15  Coaxial configuration

MODULAR VEHICLE CONFIGURATION MANAGEMENT SYSTEM AND METHODS

CROSS-REFERENCE TO RELATED APPLICATION

This application claims the benefit of U.S. Provisional Application No. 63/029,403, filed May 23, 2020.

BACKGROUND

The invention is related to automated drone configuration. Up until now, there hasn't been any efficient way to manage and update drones.

BRIEF DESCRIPTION OF THE DRAWINGS

FIG. 7 shows the generated motor mapping corresponding to the vehicle in quadcopter configuration;

FIG. 8 shows the generated motor mapping corresponding to the vehicle in coaxial configuration;

DETAILED DESCRIPTION

Figure 1:
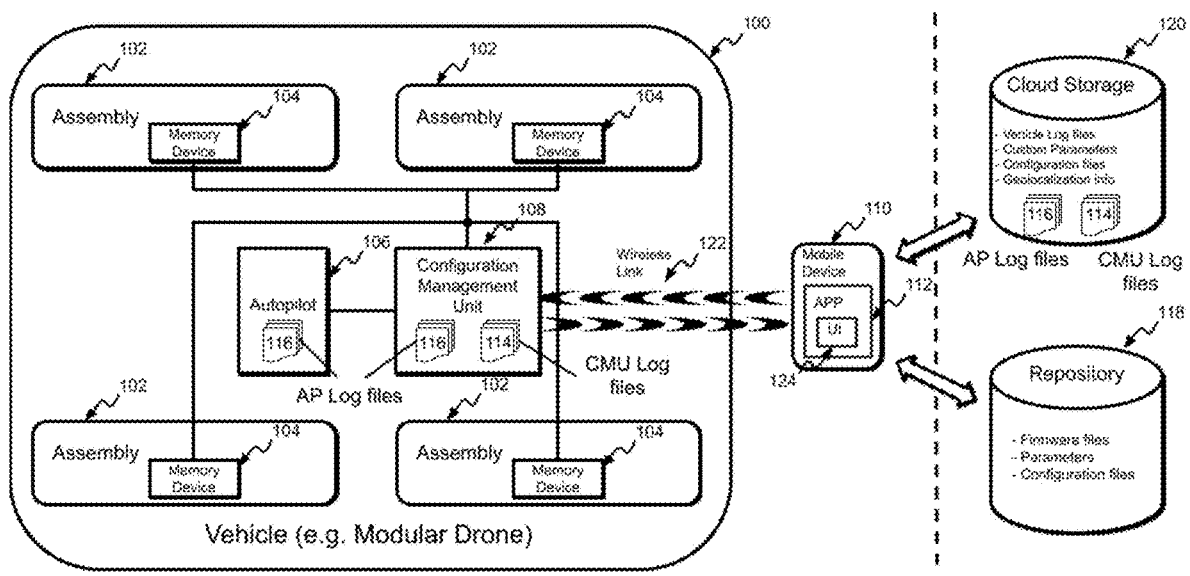
FIG. 1 is an overview of the invention including the Configuration Management Unit and Assemblies mounted to the vehicle.
Figure 2:
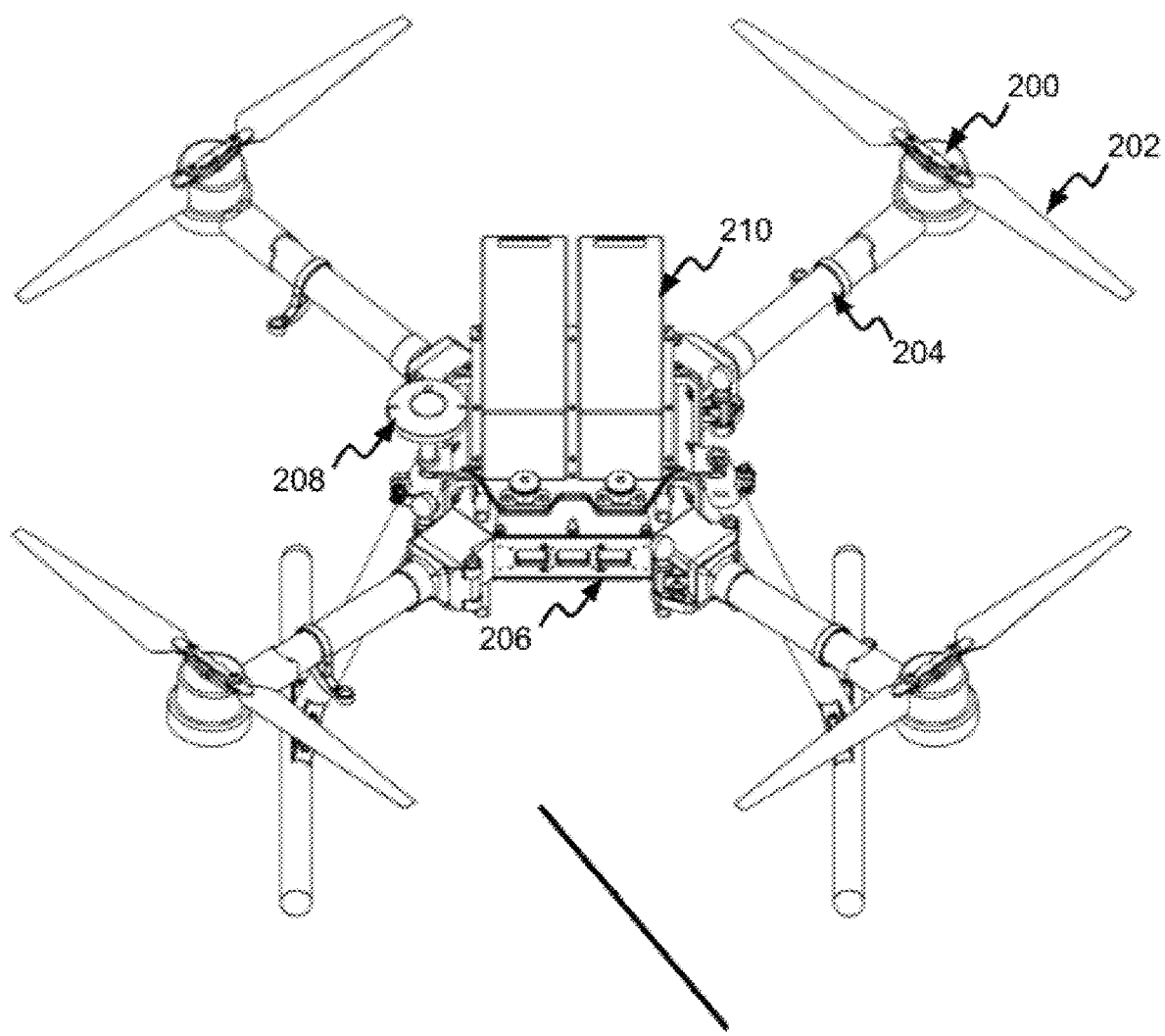
FIG. 2 is a 3D view of a possible configuration of a contemplated vehicle of the invention in quadcopter configuration.
Figure 4:
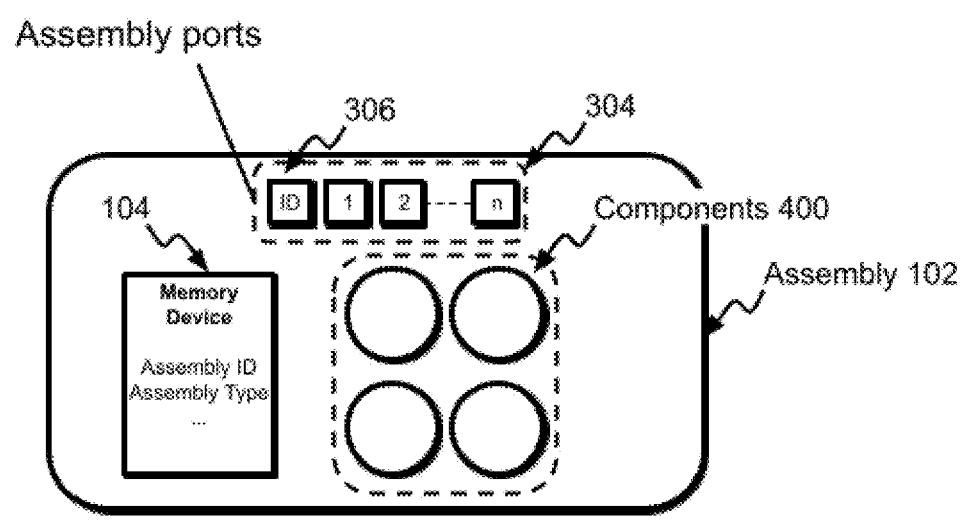
FIG. 4 is a diagram of a generic assembly including a Memory Device and Components.

The present invention relates primarily, but non-exclusively, to the automated configuration of modular drones 100. This invention can also be applied to many types of other vehicles. Modular drones 100, as presented in FIG. 1, are drones that can be physically configured using modular components and assemblies 102 thereof. Some of these modular components 400 are illustrated in FIG. 2 and include components such as, but not limited to one or more motors 200, propellers 202, booms 204, Electronic Speed Controllers 302 (ESC), batteries 210, autopilots 106, GPS modules 208, radio modules (including RC radio and telemetry radio), onboard displays, payloads and sensors, such as cameras, gimbals, laser range finders, radars, sonars, carrier boxes and other equipment that may be added to a drone 100. An assembly 102 is a system comprising one or more components. FIG. 4 shows a generic assembly 102, comprising components 400, Memory Device 104, assembly ports 304 and assembly ID port 306, which provides access to the Memory Device 104.

Figure 3:
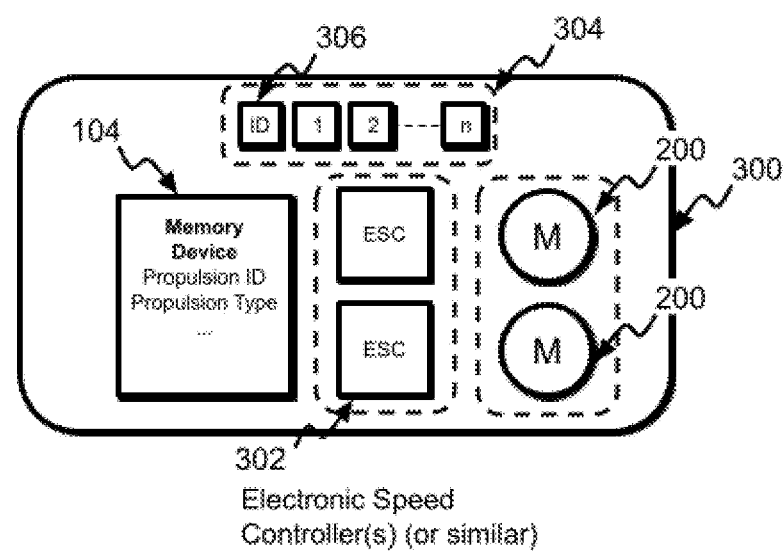
FIG. 3 is a diagram of a propulsion assembly including a Memory Device, ESC and motors.

FIG. 3 illustrates a propulsion assembly 300. A propulsion assembly 300, as the name suggests, is an assembly comprising a memory device 104, a boom 204, one or more ESC(s) 302, one or more motor 200(*s*), one or more propeller(s) 202 and ports 304 to access the memory device 104 and control components of the assembly. The ports 304 include an ID port 306 that provides access to the Memory device 104.

[Automatic Configuration]

Using the invention, a drone autopilot 106 is automatically configured by detecting the assemblies 102 that are mounted on the drone 100. Each assembly 102 includes one or more components and at least one memory device 104 that contains information related to the assembly 102, stored thereon. This information includes data that uniquely identifies the assembly 102 that it is mounted on, such as a unique serial number. The information also contains an assembly type identifier that indicates the type of assembly 102. For example, the assembly type identifier may be a value that corresponds to a motor type, a center frame 206, a propulsion type, or a battery 210 type. By reading the assembly type identifier from the memory device 104 a Configuration Management Unit 108 can identify the assembly 102 and in turn determine how to configure the vehicle 100's autopilot 106 based on the detected assembly 102. An assembly 102 may contain one or more other assemblies 102.

In an alternative embodiment, the memory device 104 only contains a unique identifier and the rest of the information is stored in the Configuration Management Unit 108. In this embodiment, the Configuration Management Unit 108 uses the unique identifier to perform operations such as looking up, retrieving and updating the corresponding information.

[Configuration Management Unit]

The present invention includes a Configuration Management Unit 108. This Configuration Management Unit 108 is a computing device that is mounted on the vehicle 100 and coupled to the vehicle 100's autopilot 106. Such coupling is preferably through a serial communication such as a UART or RS-232. Alternatively the Configuration Management Unit 108 may be coupled to the autopilot 106 via other wired connections such as CAN, ethernet, I2C, SPI or other wired means. The Configuration Management Unit 108 may also be coupled to the autopilot 106 through a wireless connection such as Wifi, Bluetooth, or other wireless communication methods. The Configuration Management Unit 108 has a form factor that makes it suitable to be mounted on a vehicle 100. At its core the Configuration Management Unit 108 has memory, a processing unit and communication ports, such as serial, ethernet, Wifi, Bluetooth, USB, CAN and similar.

The role of the Configuration Management Unit 108 is to manage the vehicle configuration. It can communicate with memory devices 104 installed on the various modular assemblies 102 of the vehicle 100 to retrieve assembly identification information, such as a serial number, a propulsion ID or propulsion type, equipment type, manufacturing date, installation date, and other relevant equipment information. Further, the Configuration Management Unit 108 can store data on memory devices 104 such as usage information including number of power cycles, flight time, maximum power usage, maximum temperature recorded and other relevant data related to maintenance and ownership of the modular assembly 102.

[Communication Protocol Between Autopilot 106 and Configuration Management Unit 108]

The Configuration Management Unit 108 communicates with the autopilot 106 using a communication protocol. An example of such a communication protocol is the MAVLink protocol. Different autopilots 106 communicate with Configuration Management Unit 108s using different communication protocols. Also, depending on the type of data or status of the autopilot 106, different protocols may be used. For instance, a certain communication protocol may be employed for loading firmware, whereas another protocol may be used for loading parameters. In some cases, the same protocol may also be used to perform both operations.

The role of such communication protocols is to carry data that includes configuration and control information. For instance, one communication protocol allows updating one or more of the firmware of the autopilot 106 and sending control data such as vehicle directional instructions. These directional instructions include at least one of roll, pitch, yaw, throttle commands or other similar instructions, such as speed commands or altitude commands. Further, such communication protocols further allow sending flight plans, waypoints, and other flight or mission operations to the controller. In return, the autopilot 106 returns updates about the vehicle 100's operational status and position and any other information about the vehicle 100, such as voltages, current, remaining battery 210 capacity, speeds, acceleration and other vehicle 100 related data.

In the embodiment in which the Communication Management Unit is collocated on the Autopilot 106, the communication is done locally via interprocess communication or local networking, or other local communication methods.

[Communication Between the Configuration Management Unit 108 and Mobile Device 110]

The Configuration Management Unit 108 is connected to a Mobile Device 110 preferably through wireless communications means 122. Wireless communication means 122 include Bluetooth, Wifi, cellular networks such as 2G, 3G, 4G, 5G, GSM, CDMA or such, radio frequency, infrared, audio or another transmission means, allowing data to be transferred from one electronic device to another. In an alternative embodiment, the Configuration Management Unit 108 and the Mobile Device 110 are connected through a wired communication type, such as USB, UART, RS232, or other wired communications means.

Through the use of this communication means, the Configuration Management Unit 108 and Mobile Device 110 can exchange data pertaining to autopilot 106 configuration.

In one exemplary method of this invention, the Mobile Device 110 maintains a list of firmware versions that can be installed on the autopilot 106. The Configuration Management Unit 108 either requests the entire list or a partial list of versions of firmware that are available. Alternatively, the Configuration Management Unit 108 may simply communicate the current version numbers of the parameters and firmware that were used to configure the vehicle 100 to the Mobile Device 110.

[Parameters]

The present invention configures the drone 100 using parameters. In particular, these parameters may include: motor gains (PID or such), flight gains (PID or such), number of motors, motor ports 304 (e.g. the pins that the motors 200 are connected to on the autopilot 106). Further vehicle parameters may optionally be included such as total battery 210 capacity, equipment configuration, RC channels, GPS 208 settings, telemetry settings, altimeter gains, retracts configuration, etc. Some of these parameters may be default firmware parameters, whereas other parameters are customer parameters provided by the manufacturer.

[Repository 118]

Vehicle configuration data is stored in a repository 118 on a server that is accessible online, or on a private network (e.g. a local network, a VPN or similar). This data contains vehicle parameters such as vehicle control PIDs, motor PIDs, speed configuration details as described previously.

[Firmwares]

Further the repository 118 also stores firmware files that can be flashed (installed/copied) on the vehicle 100. In one exemplary embodiment, these firmware files are ArduCopter firmware. In this case, the server may store a version of the ArduCopter firmware for quadcopters and an ArduCopter firmware for octocopters. Other possible firmwares include all ArduPilot versions (Copter, Rover, Sub, Plane . . . ) PX4, Openpilot, Libre pilot, Micropilot, Cleanflight, Betaflight, Butterflight, DJI, Paparazzi, Inav, Autoquad or even a custom firmware.

Each file has one or more of a version number and a date associated with it.

The files may be stored on one or more of a cloud folder, a website folder, an ftp server, a file repository such as a git repository, either of which can be open to the public or private.

The App 112 may download parameters and firmware from a plurality of file repositories such as official repositories, unofficial repositories or manufacturer provided repositories.

In a preferred embodiment, the App 112 is limited to only access files from the manufacturer's repository 118.

The manufacturer's repository 118 contains a number of approved parameters and firmware files for the vehicle 100.

The manufacturer's repository 118 contains configuration files that indicate the firmware and parameters to use depending on the detected assemblies 102.

[App]

Upon startup, an App 112 on the Mobile Device 110 checks the repository 118 to verify if there are any updates for the firmware or parameter files. If there are updates, App 112 may ask the user if the update should be downloaded. The user may have selected an option to automatically download updates.

Once the updates are downloaded and verified (crc, signature, etc) the App 112 may offer to install the updates on the vehicle 100, or automatically install the updates on the vehicle 100 without user interaction, depending on the user's preference. This option may also be set by the manufacturer.

Figure 5:
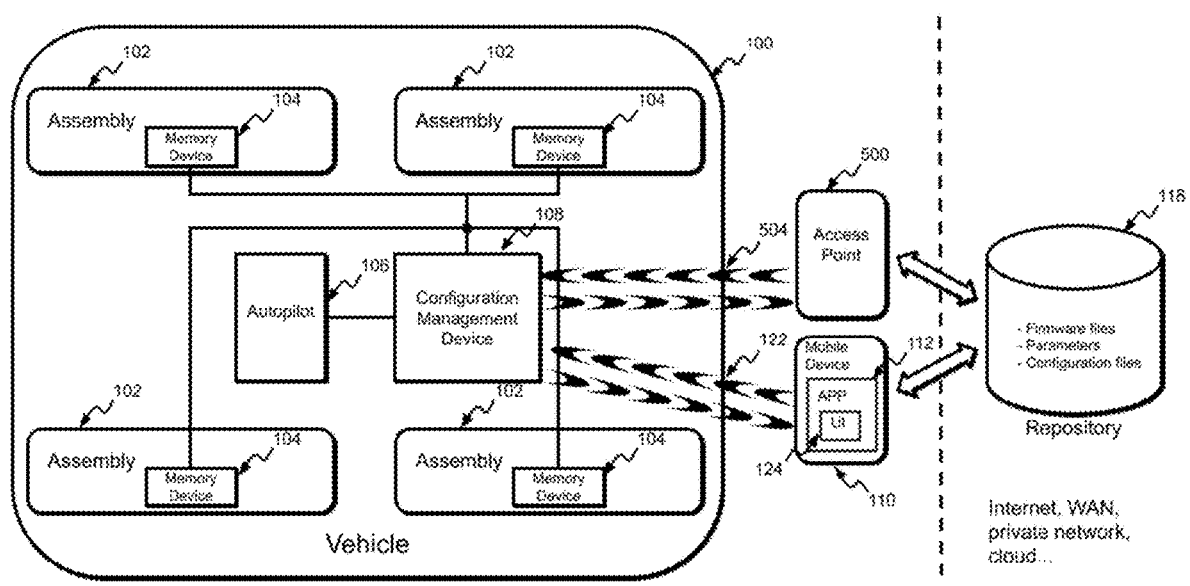
FIG. 5 is diagram of the system contemplated in the invention in which the Configuration Management Unit is connected to a mobile device and to an Access Point.

In one embodiment, as illustrated in FIG. 5, the App 112 directs the CMU 108 to fetch updates and parameters directly from the repository 118 (via an access point 500, such as a wifi router or similar, using a wireless link 504), instead of via the App 112. The CMU 108 then uses a network connection to request and receive updates and parameters from the repository 118.

[Components and Assemblies]

Modular vehicles 100 as described in this invention are composed or equipped with assemblies 102, as illustrated in FIG. 4. An assembly 102 is a set comprising one or more components and an associated memory device 104. The memory device 104 may be a standalone device or be part of an electronic controller unit, such as a microcontroller or a single board computer, or even a computing system containing multiple boards. The memory device 104 contains data related to and describing the assembly 102. Components are individual parts that do not contain an assembly memory device 104. For example a component may be a propeller 202, a motor 200, a battery 210, a bolt, a wire or other such part. Components can in turn be composed of sub-components. The main distinction between assembly 102 and component is that assembly 102 has a memory device 104. This memory device 104 contains information that the Configuration Management Unit 108 will use to determine how to configure the vehicle 100's autopilot 106.

Assemblies 102 contain ports 402 to allow communication with the Configuration Management Unit 108 and the autopilot 106. One port allows access to the memory device 104 whereas the other ports 304 may be used to control components of the assemblies 102. For example motor signals are sent through some of the assembly ports 402. Depending on the assembly 102, different signals may be sent through the ports 402, as required. In one embodiment all this data may be multiplexed through the same port.

[Propulsion Types and Assemblies]

As stated initially, the preferred vehicle contemplated in this invention is a modular drone, otherwise known as unmanned aerial vehicle or remotely piloted aircraft. Naturally, the invention may be applied to similar types of modular manned or unmanned vehicles. Such modular propulsion systems are composed of individual propulsion system components, including propellers 202, motors 200, ESC 302, booms 204 or assemblies 102 of these components. For example, in a preferred embodiment, the propulsion system is an assembly 102 of propeller 202, and motor 200. In another preferred embodiment, an assembly 102 is a set of propellers 202, motors 200, ESC 302, and booms 204. This whole assembly 102 may be swapped out for another assembly 102. For example, an assembly 102 with one propeller 202, one motor 200, one ESC 302 and one boom 204, may be swapped out for another assembly 102 with two propellers 202, two motors 200, two ESCs 302 and one boom 204.

Figure 12:
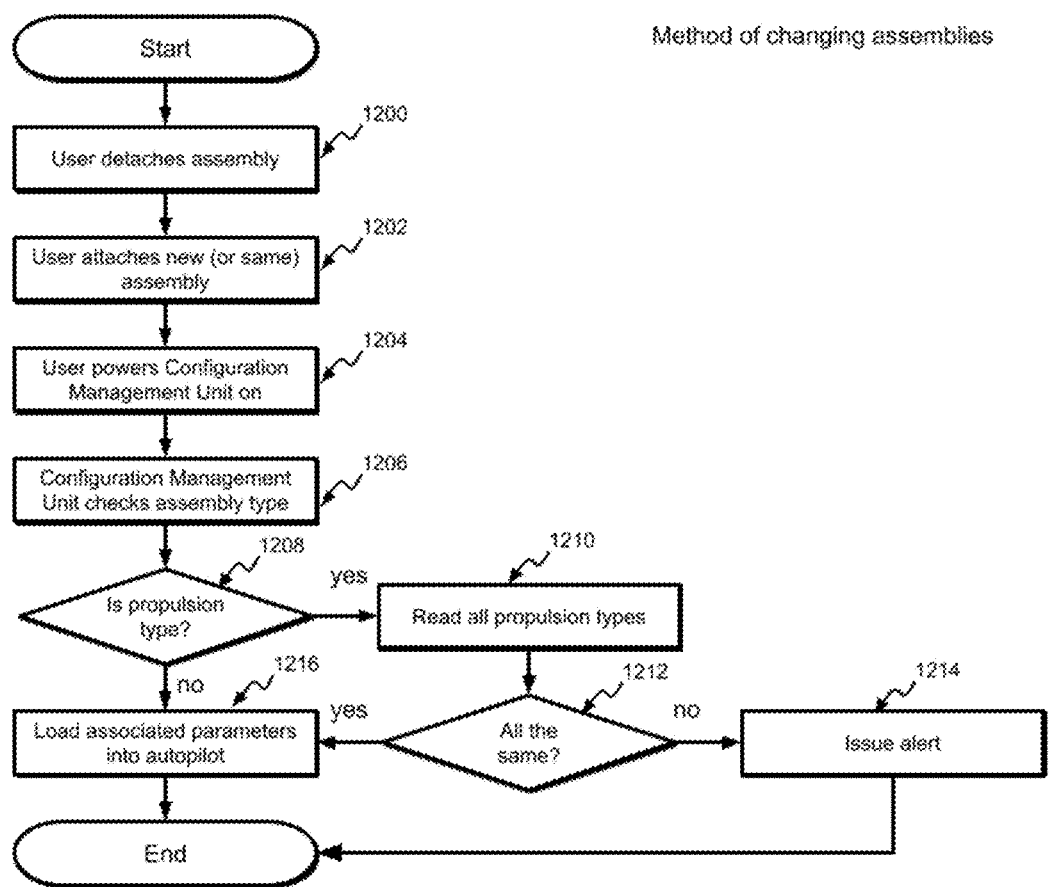
FIG. 12 shows a method of changing and detecting assemblies in accordance with an embodiment of the invention

The drone 100 has attachments that allow interchanging the drone 100's booms 204 (also known as arms) 204. The booms 204 are usually made of lightweight materials such as carbon fiber tubes, aluminum or similar materials. The drone 100's booms 204 are usually mounted at every 90 degrees (standard quadcopter configuration). Other angles are possible, as well as number of booms 204. The user can remove or unlock attachment for each boom 204, disconnect the power wires and control (PWM, or other) wires and completely remove the propulsion assembly 300. The user can then install another propulsion assembly 300 that is suited to a particular mission. This method is illustrated in FIG. 12. In step 1200, the user detaches the assembly. In step 1202, the user attaches a new assembly. After power on (step 1204), the Configuration Management Unit 108 will check this newly connected assembly (step 1206). If it is a propulsion assembly (step 1208), the CMU 108 will read all the other propulsion types (step 1210) and if they are all the same (step 1212) the associated parameters for this type will be loaded into the autopilot 106. If the propulsion types are not the same, an alert is issued (step 1214). If the new assembly is not a propulsion type (e.g. a battery, a camera, a gimbal . . . ) then the associated parameters for this assembly is loaded into the autopilot 106 (step 1216).

In another example, an energy assembly, composed of one or more batteries 210, may be swapped out for another assembly 102 with one or more batteries 210. This same concept may be applied to any other component or assembly 102 of components. Other types of interchangeable components include, landing gear, camera, camera gimbal or payload, such as an item to be delivered, a mechanism to deploy payloads remotely, an agricultural spraying apparatus, among others.

[Booms 204]

In one configuration the booms 204 have one motor 200 each. In another configuration, the booms 204 have two motors 200 each. In yet another configuration, the booms 204 have multiple motors 200 and propellers 202. The booms 204 are preferably made of carbon fiber tubes, but can also be made of other materials, such as fiber glass, aluminum or other materials used in aircraft manufacturing (wood, composites, etc.). A user may swap these propulsion configurations depending on the flight mission requirements. For example, one mission might require a longer flight time and thus might benefit from using longer booms 204 with long propellers 202, using only four motors 200. Another mission might require lifting a heavier payload or might require mechanical redundancy in the event of a propeller 202, ESC 302, or motor 200 failure, which are provided by an eight motor 200 configuration.

In one preferred embodiment, the manufacturer may provide the option to swap between the X4 (four motors 200, one on each boom 204 in X configuration) and X8 (coaxial configuration with four booms 204 with 2 motors 200 each, one above the other.) This configuration allows having a simple common center platform with core electronics and 4 attachments for the booms 204.

In alternative embodiments, the center frame 206 assembly (or component, if no memory is attached) of the vehicle 100 has up to 8 attachments such that the vehicle 100 can be configured in other modes such as Y3, Y6, H4, octo and other well known multicopter configurations.

Figure 11:
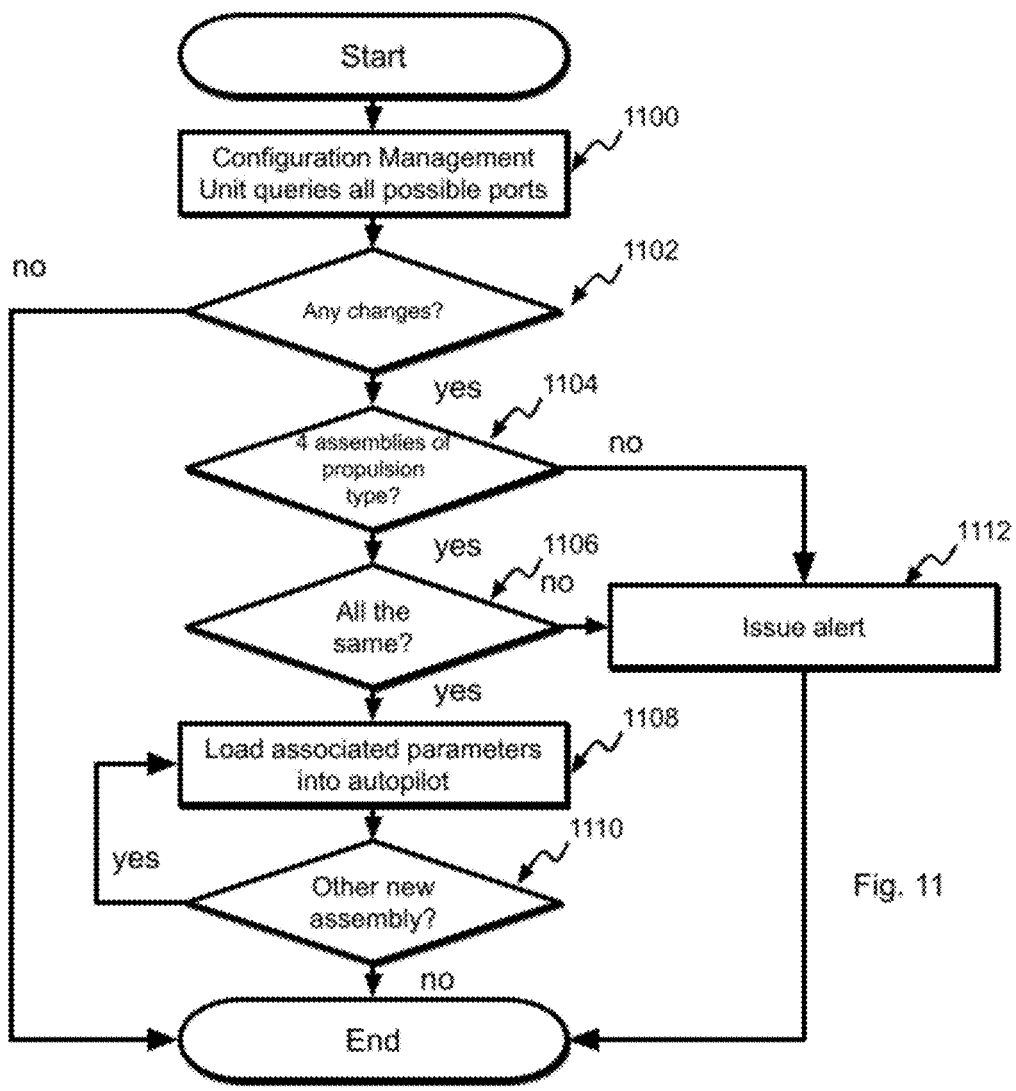
FIG. 11 shows a method of checking assemblies mounted on a vehicle at start up in accordance with an embodiment.

FIG. 11 shows a method of checking assemblies 102. Step 1100: upon power-on of the vehicle 100, or alternatively at any suitable time thereafter, the Configuration Management Unit 108 queries the memory devices 104 in each of the assemblies 102 to identify the configuration of the modular vehicle 100. In step 1102, if no changes are detected, the method ends, otherwise it proceeds to step 1104. If the Configuration Management Unit 108 determines that there are 4 assemblies of propulsion type, the method proceeds to step 1106, if not the method proceeds to step 1112, in which an alert is issued. In step 1106 if the method detects 4 similar propulsion assemblies 300, it will load the firmware configuration for quadcopters onto the autopilot 106 along with appropriate parameters related to this four motor configuration in step 1108. Such parameters may include control signal values (PID or such) for the autopilot 106, set by the manufacturer or by the user. Similarly, if the autopilot 106 detects that the propulsion type is coaxial with 8 motors, it will load the firmware and related parameters for a coaxial octocopter onto the autopilot 106 in step 1108. Some autopilots 106 can be configured to change between quadcopter and octocopter (coaxial or not) configuration without having to change firmware. Such autopilots 106, contemplated in this invention, only require setting a configuration parameter within to set such configuration. If the 4 propulsion assemblies are not of the same type, an alert is issued (step 1112) and the method ends. If the 4 assemblies are of the same type, then the method proceeds to step 1110 in which it is checked whether the new assemblies are present on the vehicle in which case the method proceeds to steps 1108 again in which the associated parameters for this assembly are loaded into the autopilot. The process ends when there are no further new assemblies detected.

[Autopilot 106]

Autopilots 106 are devices that perform the controls necessary for vehicle 100 operation. Usually, an autopilot 106 will run control algorithms to control vehicle 100 kinematics, and receive live inputs from a remote user. Autopilots 106 may automatically follow a flight plan defined by waypoints. Autopilots 106 are not limited to unmanned aircraft but can also control other types of vehicles, usually, but not necessarily unmanned, such as, boats, rovers (land vehicles, etc), legged vehicles, underwater vehicles, rockets, balloons, missiles, etc. Examples of autopilots 106 include: Ardupilot, PX4, Openpilot, Librepilot, Micropilot, Cleanflight, Betaflight, Butterflight, DJI, Paparazzi, Inav, Autoquad.

[Computers]

Part of the invention may employ one or more computers. Such a computer comprises one or more CPUs, RAM devices, large storage devices and communication ports.

[Software on a Computer Readable Storage Device]

Part of the methods described in the invention is implemented as software. This software is stored on one or more computer readable storage devices. Such computer readable storage devices could be a harddisk, flash, rom, ram, sd-card, cd-rom, or any other storage device that tangibly stores data. Such software contains instructions that when executed on a computing device, such as the autopilot 106, Configuration Management Unit 108, Mobile Device 110 and server cause these devices to perform the methods described in this invention.

In one preferred embodiment, software stored on a memory device 104 is executed on the processor of the Configuration Management Unit 108 to retrieve firmware and parameters for the autopilot 106 from the Mobile Device 110, or directly from the repository 118. The App 112 is software that runs on the Mobile Device 110. Software runs on the server to store and provide the manufacturer's firmware and parameters.

[App]

In one preferred embodiment of the invention, the system includes an application on a Mobile Device 110, commonly referred to as an App 112. The Mobile Device 110 is usually a phone or tablet, running an operating system such as, but not limited to Android, Windows, IOS, Linux, or any other operating system suitable to operate Mobile Devices 110 and run applications. The Mobile Device 110 may also be a laptop or just a portable computer. In this preferred embodiment, the App 112 has a graphical user interface 124 and a set of instructions that implement business logic. The App 112 may be updated from time to time. In an alternative embodiment, the App 112 may not have a graphical user interface 124 and instead may run in the background.

This App 112 can download firmware and parameters for the autopilot 106 from the manufacturer's repository 118. The App 112 can also download firmware and parameters from other sources. In one embodiment these other sources are limited by the manufacturer.

The App 112 can send these firmwares and parameters to the autopilot 106. The App 112 can select parameters and firmware to the autopilot 106 depending on the detected configuration of the drone 100. The App 112 may further send user indicated or selected parameters to the autopilot 106. The App 112 has a user interface 124 that enables a user to select configuration parameters or preferences.

The App 112 may direct the Configuration Management Unit 108 to fetch parameters, preferences, and firmware from the repository 118. In this case, the CMU 108 will connect to the repository 118 via a wireless or wired communication link. In one embodiment, the CMU 108 will connect to the Internet via Wifi and connect to the repository 118 to download updates and other configuration data. This can happen following a request from the App 112, or at a pre-scheduled time.

1) App 112 has the ability to display the following:
   a) Aircraft flight hours (counted by the Configuration Management Unit 108)
   b) Individual Propulsion ID Numbers & Flight Hours
   c) Propulsion type for each propulsion system
   d) Propulsion type mismatch alert
   e) A guide on how to calibrate ESCs 302
   f) All information stored in the memory devices 104
   g) Additional information provided by the Configuration Management Unit 108

2) App 112 has the ability to program the following:
   a) Low and High Flight Gains (for a small payload and large payload for each prop
   b) ulsion system);
   c) Other flight gains and control parameters provided by manufacturer;

d) Motor test (to ensure proper install and programming)—spins each motor 200 slowly;
e) ESC 302 & GPS 208 Calibration (simply show text of how to do it with the throttle stick);
f) Update firmware using either manufacturer provided firmware versions or publicly available firmware versions; and
g) Any other autopilot 106 related information.

[Ground Control Station]

If a user wishes to have more control over his aircraft, fine tune other parameters, and add on other sensors and such, the user can simply use a ground control station application such as Mission Planner, QGroundControl, etc. at any time to access the full feature set of the Autopilot 106. The ground control station can run on the Mobile Device 110, or a different device, such as a tablet, a desktop, a laptop, a website with a web display interface or any device customarily used to run ground control station software. Further, the App 112 and the ground control application may be integrated into one application, or may be tightly coupled on the same device. In an alternative embodiment, the App 112 and the ground control station are distinct applications that reside on the same device or on separate devices.

[Radio Links]

The invention uses multiple types of radio links to communicate between the Mobile Device 110 and the Configuration Management Unit 108 and between the Mobile Device 110 and a server side network. The server side network may be a public network such as the Internet or a private network such as a private LAN, WAN, VPN or similar. Alternatively the Mobile Device 110 may be connected to the server side network using a wired connection means, such as USB, serial, or any other suitable wired data connection.

[Link Between Mobile Device 110 and CMU 108]

The link between the Mobile Device 110 and the Configuration Management Unit 108 may be Bluetooth, Wifi, Xbee, FrSky, LoRa, DMS, digital RF, or other similar wireless communication means.

[Memory Device 104]

A memory device 104 is affixed to an interchangeable assembly 102 such that the Configuration Management Unit 108 may query the memory for information that is related to the interchangeable assembly 102. This memory device 104 may be screwed in, glued, encased, welded, or soldered to the interchangeable assembly 102. The memory device 104 may be powered by the vehicle 100, directly by a battery 210 or wirelessly (for example using RFID or similar).

For example, in the case of the interchangeable propulsion system, the memory device 104 is encased in the boom 204 attachment. The memory device 104 is populated on a circuit board with connectors that enable a user to connect the power supply wires and data wires from the vehicle 100.

The memory device 104 mounted on the interchangeable assembly 102 may be an EEPROM, UVPROM, FLASH memory, memory button, memory tag, RFID tag, a ROM, or any other similar memory device that can retain data.

Alternatively the memory device 104 may be part of a microcontroller. In this configuration the microcontroller acts as a gatekeeper to the memory device 104 to limit access to the data stored in the memory device 104. This access limitation can be done using a key, token, password or passcode. For instance, the microcontroller may protect the flight time record such that it cannot be tampered. The microcontroller is in charge of incrementing the flight time and returning the current value upon request.

Additionally, the microcontroller can be configured to relay sensor information from the interchangeable component using integrated sensors and external sensors. For instance, the microcontroller relays temperature, acceleration, impact, vibration, current, voltage from sensors.

[Shift Register]

In an alternative embodiment, the memory device 104 is a shift register that provides the assembly ID, such as the propulsion ID in the case of the interchangeable propulsion component. This shift register cycles the bits of the ID such that the Configuration Management Unit 108 can read this ID in a sequence on one of its digital IO pins. The rest of the information is stored in the Configuration Management Unit 108 in this configuration.

[Data in Memory Device 104]

The assembly data is a set of information specific to an interchangeable assembly 102.

In the case of the interchangeable propulsion system, the assembly data includes one or more of: a serial number (Assembly Unique ID), a propulsion type identifier (propulsion type ID), flight time, date of manufacturing owner, and one or more of the technician's name, initials or identifier.

The flight time is a value that represents the amount of time that the vehicle 100 was off the ground. Other similar values are recorded if so desired, such as miles flown, miles driven, time armed, time powered on.

In the case of a ground based vehicle 100, the flight time is a value that represents the amount of time that the vehicle 100 was in motion. For the purpose of the invention, we also call the flight time the odometry. This is in analogy to a car's odometer and is an indicator of how much usage the assembly 102 has had.

[How to Fetch Data from the Memory Device 104]

The Configuration Management Unit 108 can fetch data from the memory device 104 using a custom or a standard communication protocol. Examples of such standard protocol include SPI, UART, CAN, i2c, TTL/serial, USB.

Figure 13:
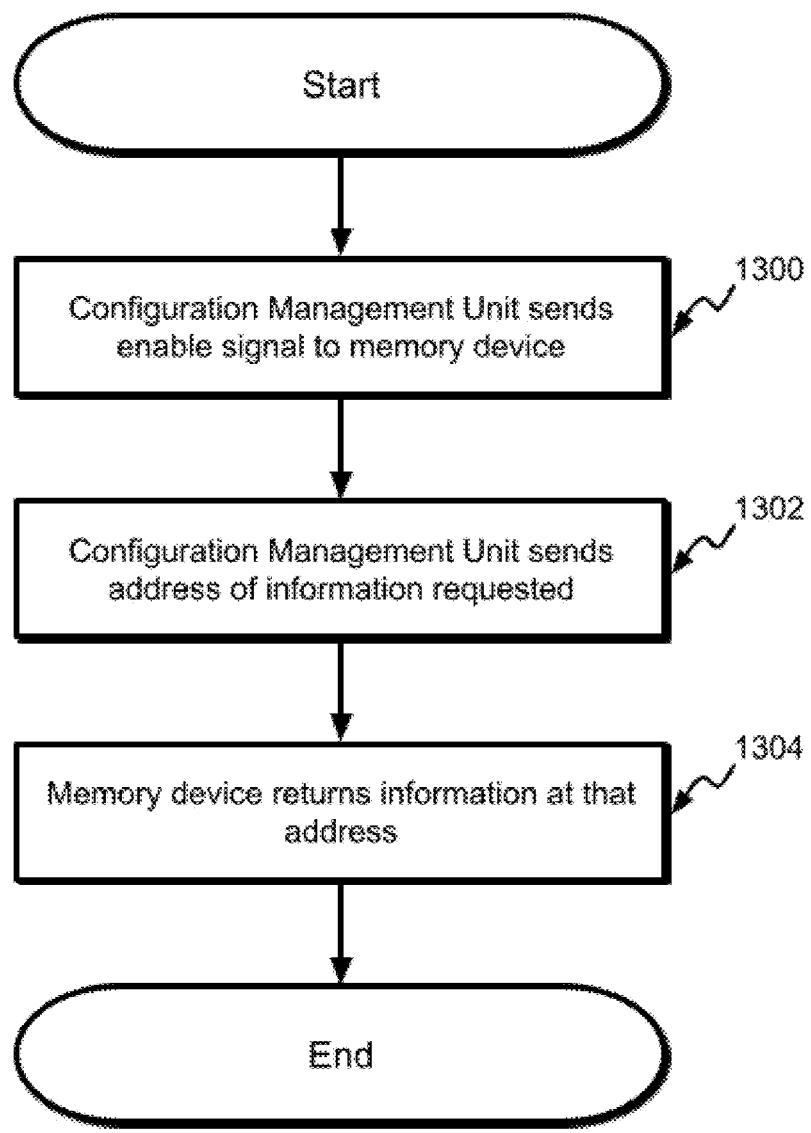
FIG. 13 shows a method of reading data from an assembly.

In one exemplary embodiment the Configuration Management Unit 108 fetches the assembly data by indicating a memory address where the information is stored. As illustrated in FIG. 13, this is done by sending an enable signal to the Memory Device 104 (step 1300). The Configuration Management Unit 108 then sends the address of the information that is requested (step 1302). Finally, the Memory Device 104 returns the address stored at that address to the Configuration Management Unit 108 in step 1304.

In another exemplary embodiment, the Configuration Management Unit 108 indicates the information it requires by name.

In another exemplary embodiment, the Configuration Management Unit 108 sends the name of the information to a microcontroller that includes the memory device 104, and the microcontroller returns the requested information.

In another exemplary embodiment, the Configuration Management Unit 108 requests a range of data from the memory device 104.

In another exemplary embodiment, the Configuration Management Unit 108 requests all the data from the memory device 104.

In yet another exemplary embodiment, the memory device 104 provides all of the stored information in a loop without receiving any request for data.

[How Data is Written to the Memory Device 104]

In one preferred embodiment of the invention, the memory device 104 on the interchangeable assembly 102 is an EEPROM memory device 104 with an SPI interface. Other protocols are of course possible and envisioned.

When multiple interchangeable assemblies 102 are mounted on a configurable vehicle 100, the SPI memory devices 104 are all connected on one bus. The Configuration Management Unit 108 starts a write sequence to a specific assembly 102 by sending an enabling signal to that device. In one embodiment, all the memory devices 104 are connected on the same bus, thus the memory devices 104 need to be read one at a time. While the memory device 104 is enabled with the enable signal, the Configuration Management Unit 108 sends an address to the device on the memory device 104's input followed by the data to be stored at that address on the memory device 104.

The memory device 104 has an optional write once area that can be only written to once, and can only be read thereafter. In one particular embodiment, the serial number, propulsion ID and manufacturing date and initial weight are written to the write once area. This has the effect that this information will not be altered once the component has been configured by the manufacturer.

Depending on the address, the data may be written to a write-once area of the memory device 104 or to an area that can be written to multiple times.

Other data such as the flight time and current assembly weight are stored in an area of the memory device 104 that can be written to multiple times.

[Write Cycle Management]

Memory devices 104 have a limited amount of write and read cycles. In order to preserve the number of cycles, the invention limits the rate of cycles depending on the useful frequency of recording or retrieving of specific data.

For instance, flight time information is recorded in the memory device 104 at a period T between 1 and 30 seconds. This corresponds to a period of time that is useful to the user. There is no need for the user to know flight time in very small increments. Thus, limiting the recording rate allows saving write cycles without adverse effects to the user.

Other information stored in the memory device 104 may be stored or retrieved at different rates depending on the application. For example, the number of flights is only incremented once per flight.

[Initial Configuration of Memory Device 104]

Figure 14:
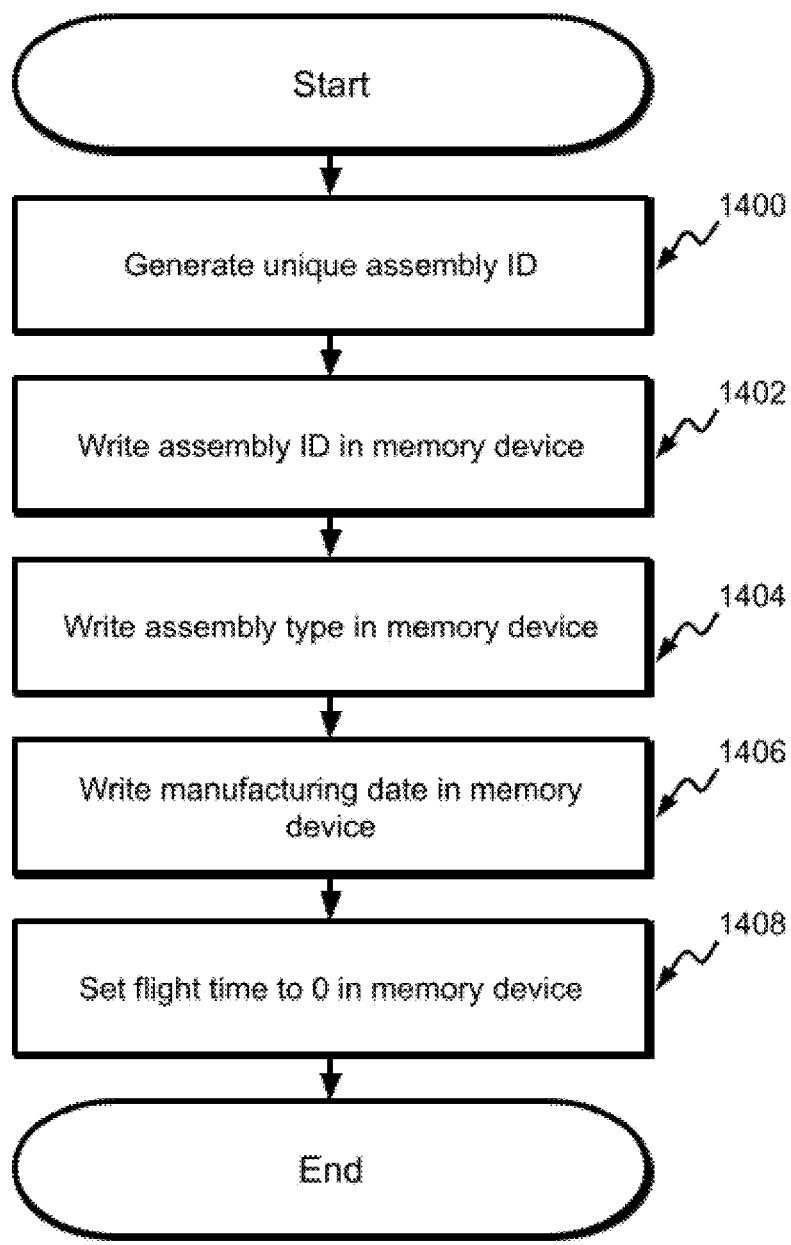
FIG. 14 shows the initial configuration method of an assembly

Typically, the manufacturer will set the initial values in an assembly 102's memory device 104, as illustrated in FIG. 14. This involves generating a unique assembly ID (step 1400) and then writing this unique ID (step 1402) and assembly type (step 1404) in the memory device 104. The manufacturing date is then written to the memory device 104 and the flight time is set to zero.

[Example Vehicle Configurations]

Figure 6:
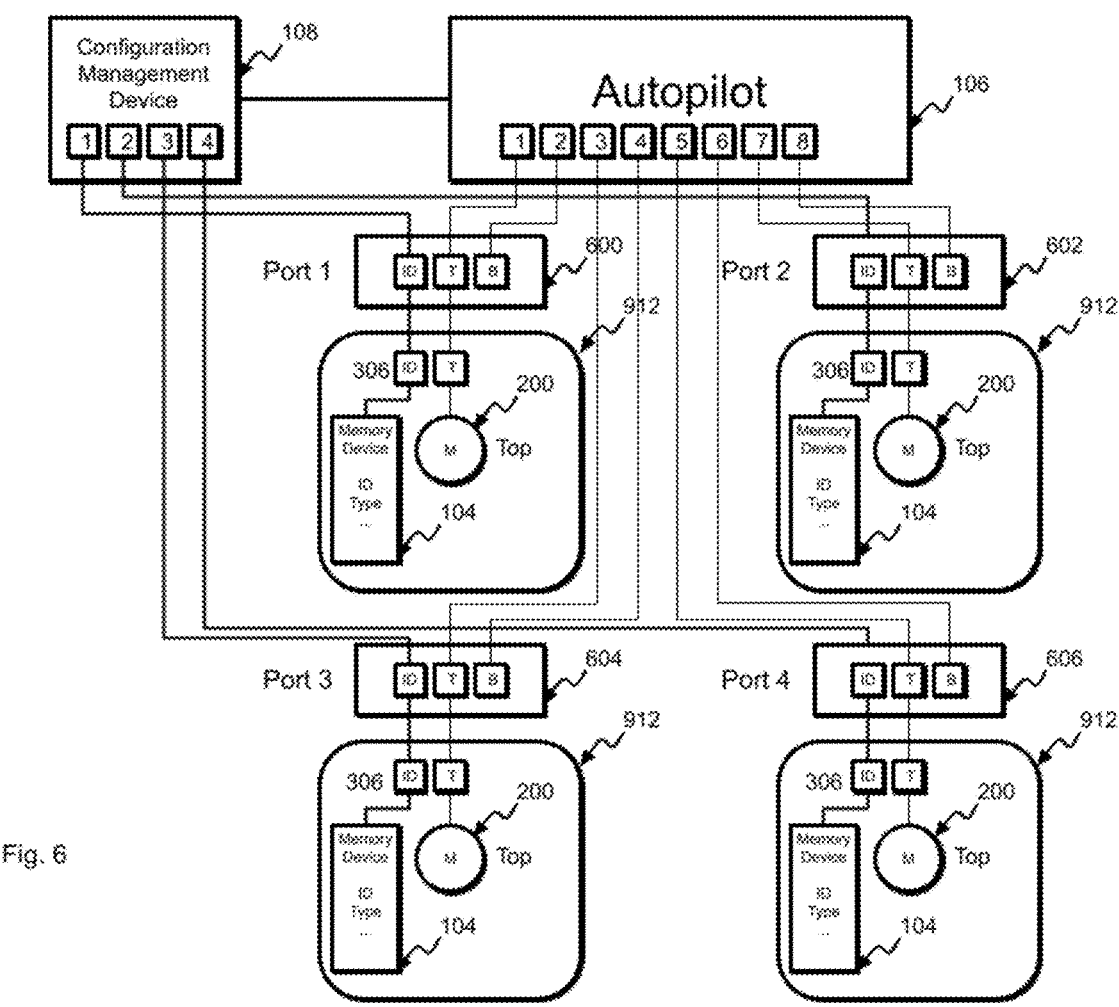
FIG. 6 is a diagram showing the connections between the Configuration Management Unit, the Autopilot and the Assemblies, illustrated Assemblies are single motor Propulsion Assemblies.
Figure 16:
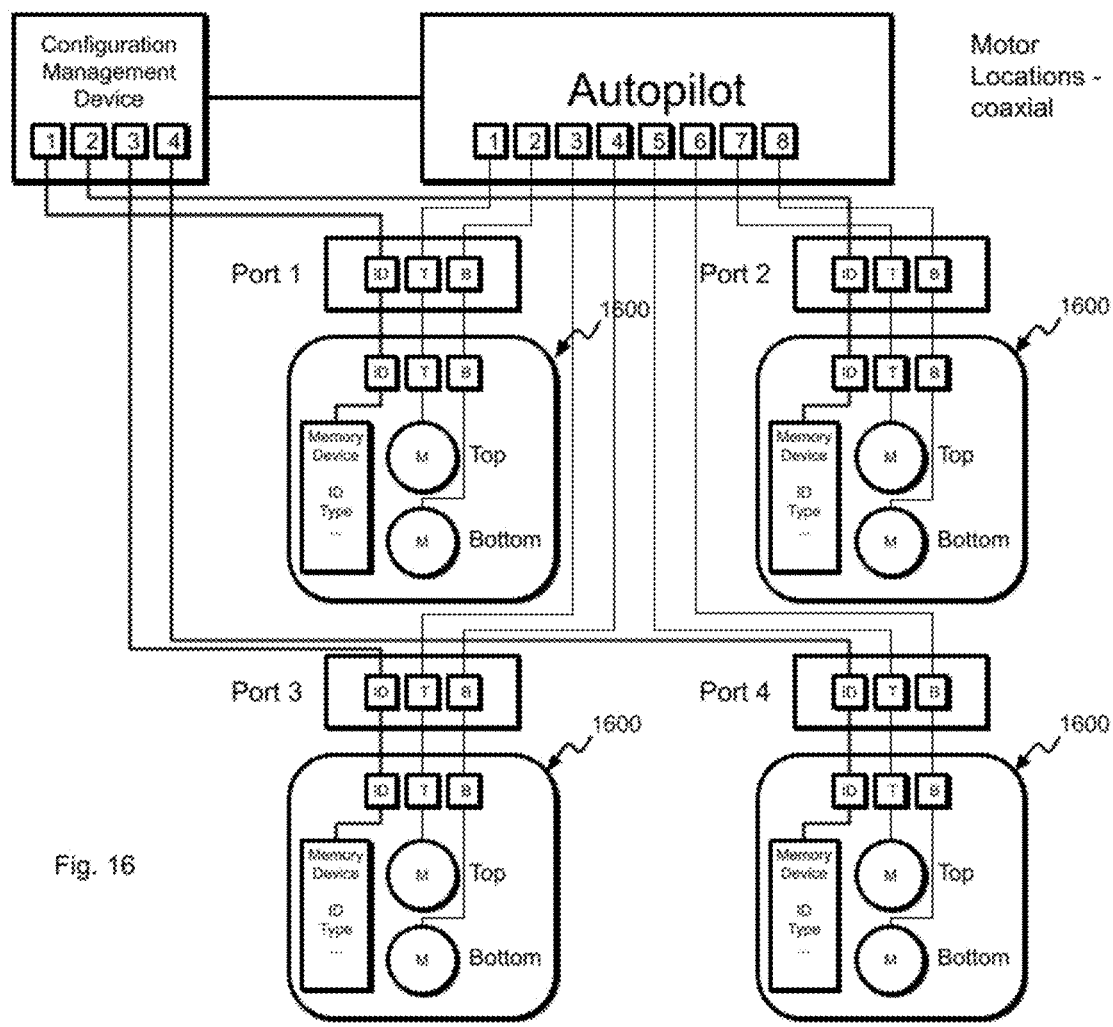
FIG. 16 is a diagram showing the connections between the Configuration Management Unit, the Autopilot and the Assemblies, illustrated Assemblies are coaxial motor Propulsion Assemblies.

FIG. 6 shows a diagram of a drone 100 in quadcopter configuration, as illustrated in FIG. 2. The drone 100 comprises an autopilot 106, a Configuration Management Unit 108 and four propulsion assemblies 102. Each propulsion assembly 300 is connected to the Configuration Management Unit 108 and to the autopilot 106. The Configuration Management Unit 108 can access the memory device 104 through the ID port 306 (via Port 1 (600), Port 2 (602), Port 3 (604), Port 4 (606)). The autopilot 106 can send control signals through the T and B ports 304 (via Port 1 (600), Port 2 (602), Port 3 (604), Port 4 (606)). In the case of a single motor propulsion assembly 900 (see FIG. 9), only the T port is available. However, in the case of a coaxial propulsion assembly 1600 (see FIG. 16), the autopilot 106 can send signals to control the top motor 200 through the T port and the bottom motor 200 through the B port.

Figure 15:
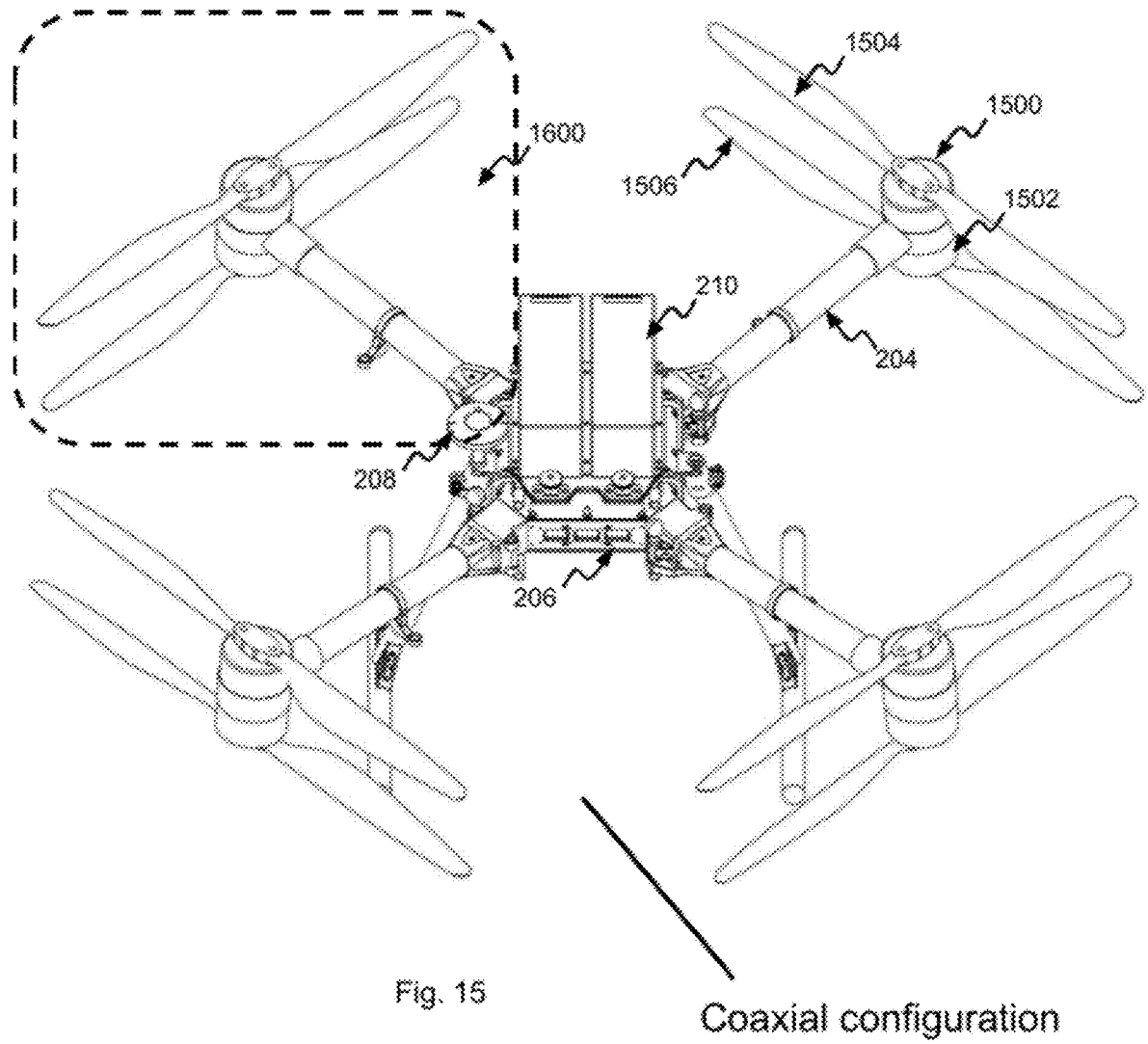
FIG. 15 is a 3D view of a possible configuration of a contemplated vehicle of the invention in coaxial configuration with coaxial propulsion assemblies attached to the center frame assembly of the vehicle.

FIG. 15 illustrates the drone 100 configured with coaxial propulsion assemblies 1600.

Figure 17:
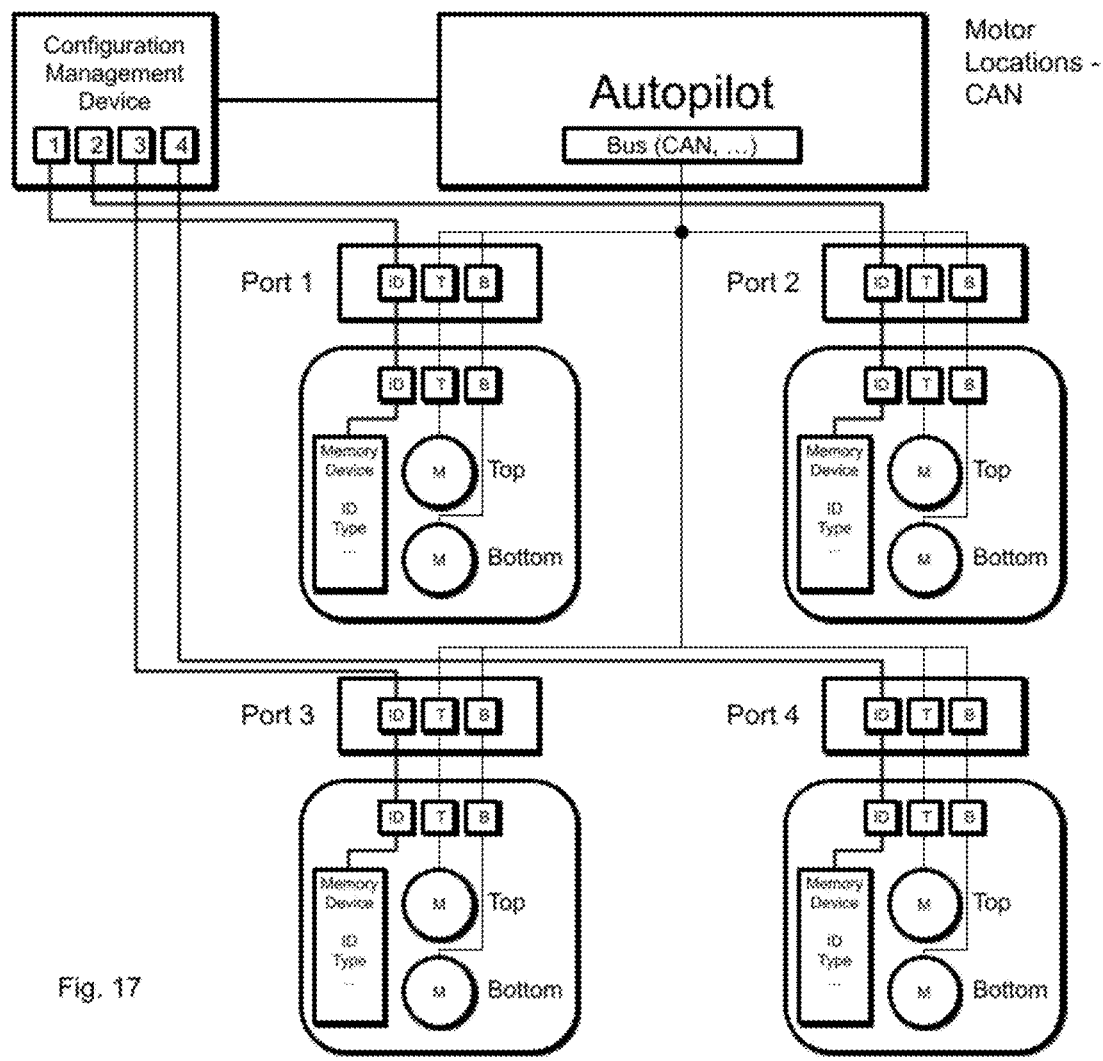
FIG. 17 is a diagram showing the connections between the Configuration Management Unit, the Autopilot and the Assemblies, illustrated Assemblies are coaxial motor Propulsion Assemblies connected in on a bus with the Autopilot.

FIG. 17 illustrates the drone 100 configured with coaxial propulsion assemblies 1600 in an alternative embodiment in which the assemblies are connected to a common bus, such as CAN bus for example.

FIG. 7 illustrates a motor pin mapping table in the quad configuration 700.

FIG. 8 illustrates a motor pin mapping table in the coaxial configuration 800.

The Configuration Management Unit 108 tells the autopilot 106 the pin connection configuration after determining the type of propulsion configuration. The pin connections are made in such a way that the autopilot 106 always knows which motor is on top and which motor is at the bottom.

[Types of Repositories]

Manufacturer provided firmwares and parameters are stored on a repository 118 that is accessible by the App 112.

The repository 118 can be public or private. In the case of a private repository 118, access to the repository 118 may be protected by one or more of a pin, password, passphrase, public/private keys, a secret key, certificates, and multiple factor authentication or any other similar customary means.

The repository 118 can be a database, a folder in a cloud service, a folder on a web server accessible through a URL, a git repository 118, a NAS, or any other form of data container accessible on a network.

[How to Store Data in the Repository 118]

From time to time, the author of the firmware may release a new version. In a preferred embodiment, the manufacturer verifies the compatibility of this new version with the manufacturer's vehicle 100. If the new release of the firmware is compatible with the vehicle 100, the manufacturer places this firmware in the repository 118. The App 112 will be able to download this new version of the firmware.

Upon testing of the new firmware version, the manufacturer may decide or need to modify the new firmware version. The manufacturer will place the modified version of the released firmware instead in the repository 118.

In one embodiment, the manufacturer is the author of the firmware as well.

From time to time, the manufacturer may also update the parameters in the repository 118. These updates may be a result of firmware changes that require new parameters. Further these updates may also be to improve efficiency, performance and handling, or any other modifications that the manufacturer wishes to provide.

The manufacturer may update firmwares and parameters at any time.

[How to Fetch and Update Firmware and Parameters]

Once the App 112 is installed on the Mobile Device 110, the App 112 periodically checks for updates to firmware or parameters stored in the repository 118. The App 112 determines that a newer version is available through the use of version numbers or dates.

In one embodiment, the App 112 compares the version number of the firmware and parameters stored in the repository 118 with the version number of the files stored on the Mobile Device 110. The version number may be an incremental number, a pointed number (e.g. version x.y.z) or any other customary scheme for indicating versions.

In an alternative embodiment, the App 112 compares dates of the locally stored versions with the dates of the versions in the repository 118.

If updates are available, the App 112 automatically downloads and stores the updates. Alternatively, the App 112 may ask the user whether the updates should be downloaded or whether the user wishes to download the updates at a later time. In one embodiment, the App 112 allows the user to choose which updates to download, in which case the App 112 will only download the selected updates. Alternatively, the App 112 may direct the CMU 108 to go ftech the updates from the repository 118.

If no file has been already downloaded, the App 112 offers the user the choice to download the firmware or parameters. Alternatively, the manufacturer may set the App 112 such that it downloads the most recent versions of the firmware, parameters, configuration settings and peripheral parameters.

In one embodiment, the App 112 automatically selects the required firmware and parameter files from the repository 118 based on the detected assemblies 102 mounted on the vehicle 100. In this case the App 112 only downloads the corresponding files.

In one embodiment the App 112 has an option that enables the user to delete the files.

[Installing Firmware and Parameters Based on the Detected Mounted Assemblies 102]

Upon power-on, the Configuration Management Unit 108 starts querying the memory devices 104. This is done in sequence, especially if the memory devices 104 are all connected on a shared bus.

In alternative embodiments, memory devices 104 may be queried in parallel.

The Configuration Management Unit 108 retrieves the assembly ID from the memory device 104.

The Configuration Management Unit 108 determines the propulsion type by determining the number of propulsion assemblies 300 and their type.

For instance, if the Configuration Management Unit 108 detects four coaxial propulsion types, the Configuration Management Unit 108 determines that the vehicle 100 is configured as an octocopter with a specific propulsion type.

The Configuration Management Unit 108 checks whether the autopilot 106 is already configured with this assembly type. If not, the Configuration Management Unit 108 loads the required firmware and parameters that correspond to the detected assembly 102 into the autopilot 106 as in step 1108 of FIG. 11. Depending on the firmware, the firmware might only require a parameter change to configure the vehicle type.

Figure 18:
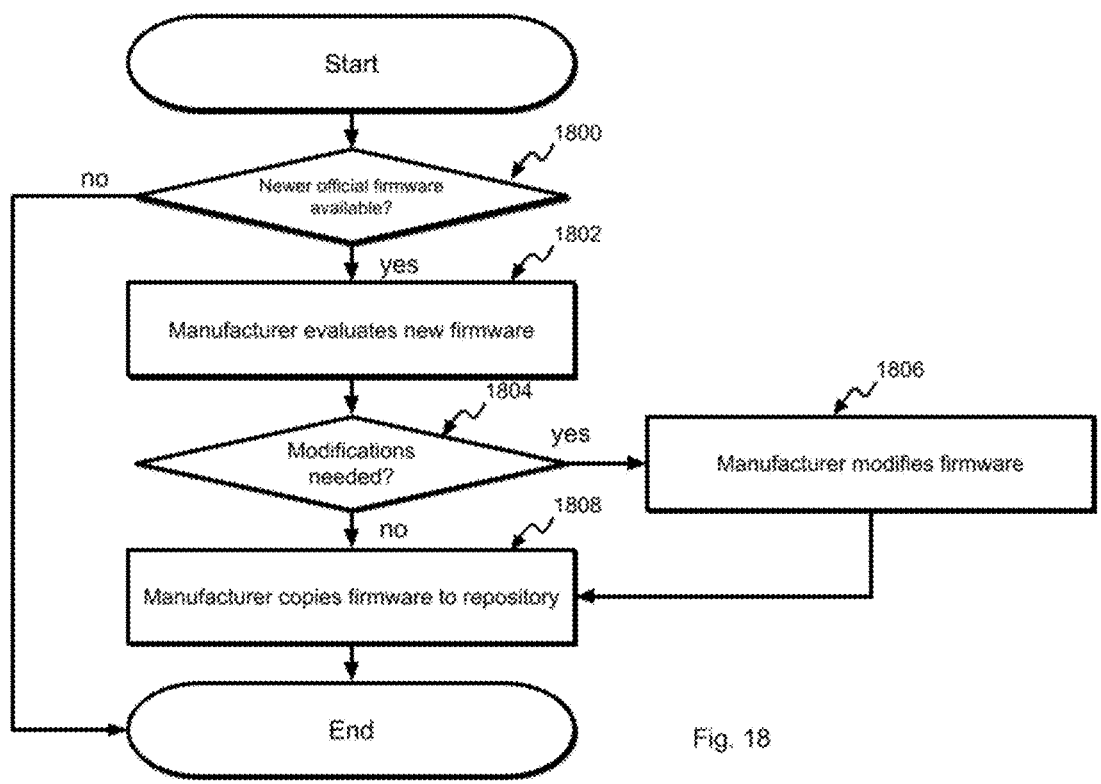
FIG. 18 shows a method of setting firmware in a repository.

FIG. 18 describes the method of setting a firmware in the repository 118. The first step in the method is checking if a new official firmware is available (step 1800). If no new firmware is available, the method ends. If a new firmware is available, the manufacturer evaluates the firmware to see if it is compatible with the vehicle 100 (step 1802). If modifications are needed (step 18904), the manufacturer will make modifications (step 1806). If no modifications are needed, the method proceeds to step 1808. In the end (step 1808), the manufacturer copies the firmware in the repository 118.

[Overriding Parameters]

In some instances, the end user may wish to tune parameters directly. These parameters would be adjusted directly on the vehicle 100's autopilot 106 using a ground control station software such as Mission Planner, QGroundControl or another suitable software.

In order to maintain the tuned parameters in the autopilot 106, the App 112 queries the parameters from the autopilot 106. These queried parameters are compared to the manufacturer's parameters. The App 112 will only modify the parameters in the autopilot 106 that have not been tuned by the user. The App 112 will offer the user to reset the parameters to manufacturer defaults.

[Sending Firmware and Parameters to the Configuration Management Unit]

Figure 21:
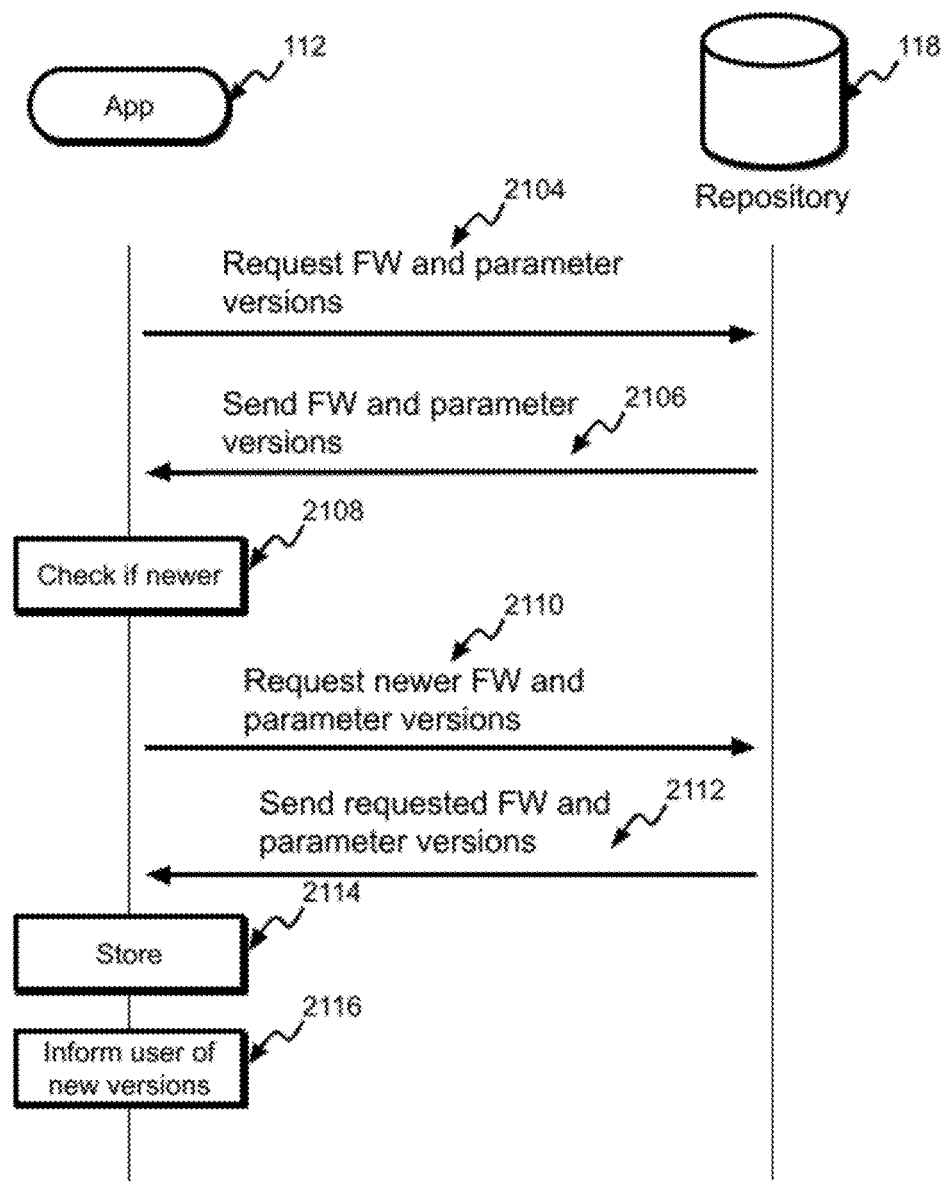
FIG. 21 is a sequence diagram showing the communication and processing steps for fetching new versions between the App and a Repository.

The invention features a method for fetching new versions, illustrated in FIG. 21. Once the App 112 is opened by the user, the App 112 sends a message to the manufacturer's repository 118 to request the latest firmware and parameter version identifiers (step 2104). The repository 118 responds with the version identifiers (step 2106). The App 112 checks if the firmware and parameter versions are newer than the ones stored in the App 112 (step 2018). If any are newer, the App 112 requests to download the new versions from the repository 118 (step 2110). The repository 118 sends the requested firmware and parameters to the App 112 (step 2112). The App 112 stores the firmware and parameters (step 2114). App 112 informs the user that a new version of the Firmware or new parameters are available (step 2116). In one embodiment the App 112 may only inform that new versions are available if the new versions are for firmware or parameters that correspond to the assemblies 102 that are installed on the vehicle 100.

Figure 20:
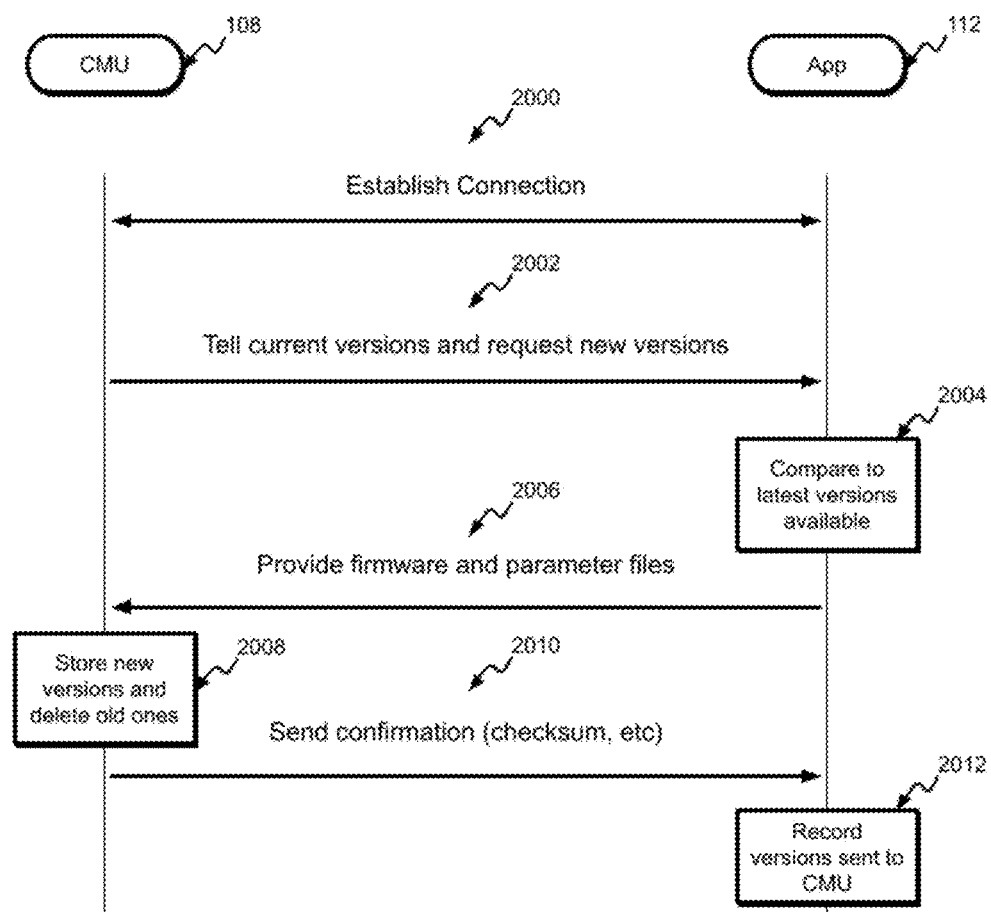
FIG. 20 is a sequence diagram showing the communication and processing steps between the Communication Management Unit and the App.

The Configuration Management Unit 108 communicates with the App 112 in order to download the latest versions of the firmwares and parameters. This method is illustrated in FIG. 20. First, the Configuration Management Unit 108 and App 112 establish a connection (step 2000). This is preferably done via Bluetooth, but other wireless 122 or wired methods are possible. Once the connection has been established, the Configuration Management Unit 108 tells App 112 which versions of the firmwares and parameters it has (step 2002). The App 112 then compares the version stored in the CMU 108 (step 2004) and sends newer firmware and parameter versions to the CMU 108 (step 2006). The CMU 108 then stores the new versions and deletes the old ones (step 2008). After this, the CMU 108 sends a confirmation to App 112 that the versions have been correctly received and stored (step 2010). This can also include a checksum or crc, or such. Finally, the App 112 saves a record of which versions were sent to the CMU 108 (step 2012).

If newer versions of the firmware and parameters for this propulsion type are available, App 112 sends updates of these to the Configuration Management Unit 108. The App 112 may offer the user the choice to send the updates to the CMU 108. Alternatively, the App 112 may send the updates automatically without asking the user, or ask the CMU 108 to retrieve updates from the repository 118. In an alternative, the CMU fetches the updates directly from the repository instead of via the App.

Once the Configuration Management Unit 108 has received the updates, the Configuration Management Unit 108 checks to see if the user customized or tuned some of the parameters. To do this, the Configuration Management Unit 108 queries the parameters from the autopilot 106 and checks them against the previous set of manufacturer parameters. Any differences are stored as custom parameters.

The Configuration Management Unit 108 informs the App 112 that there are custom parameters. The App 112 asks the user if the custom parameters should be kept or discarded. The user indicates a choice via App 112.

The Configuration Management Unit 108 then configures the autopilot 106 with the new updates and the stored custom parameters if the user indicated that the custom parameter should be kept.

Alternatively, the custom parameters are kept by default, and the App 112 has an option that the user can select to reset parameters to manufacturer defaults at any time.

[Wireless Communication Disabling Switch]

Figure 19:
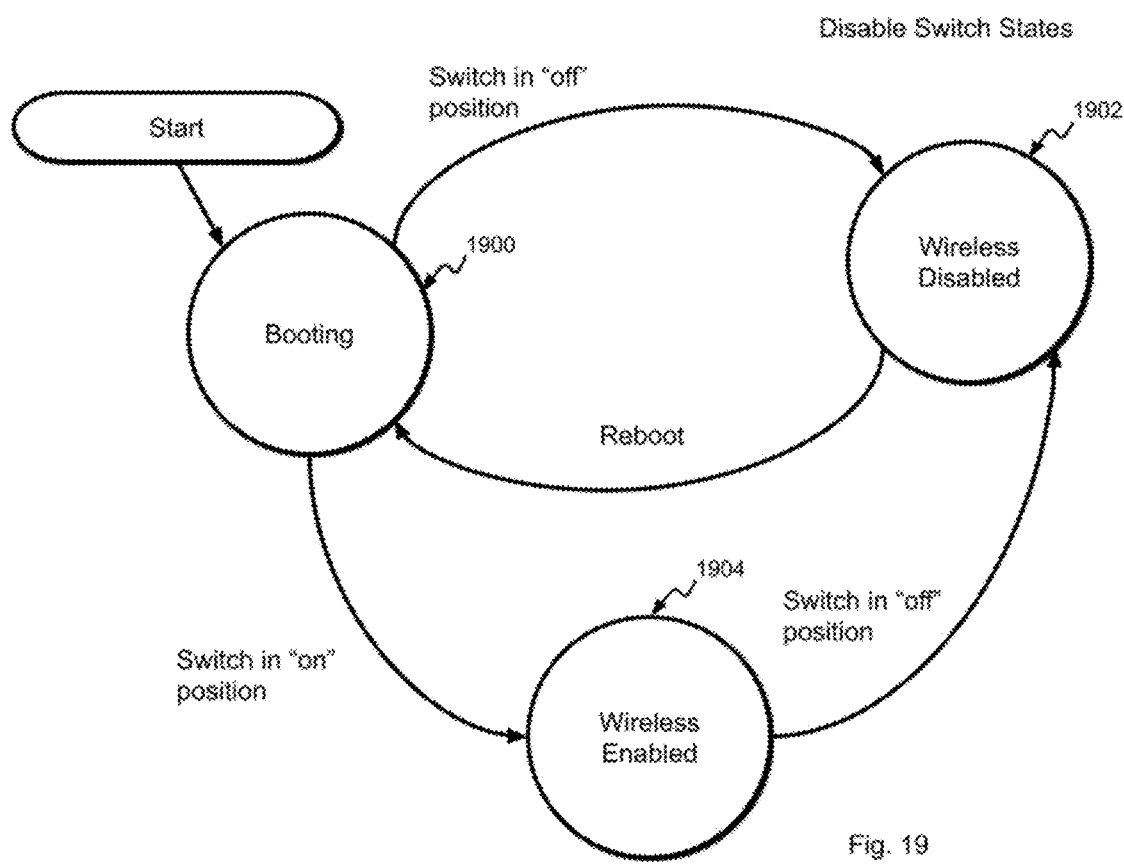
FIG. 19 is a state chart showing how the Configuration Management Unit's wireless connection is enabled and disabled.

In one embodiment, the Configuration Management Unit 108 has a switch that allows disabling wireless communication 122. Once the switch is in the disabled (or "off") position, the Configuration Management Unit 108's wireless connection 122 is disabled. The wireless connection 122 can only be enabled by setting the switch in the enabled position and restarting (or rebooting) the Configuration Management Unit 108. This prevents third parties from communicating with the vehicle 100 during its operation as the switch needs to be set in the "on" position. Especially in the case of a drone 100 it is not possible to turn the switch to "on" in flight since the drone 100 is in the air and thus not accessible. Further the wireless communication 122 can only be enabled after a reboot, which is also not possible to do with the wireless communication 122 disabled and no physical access to the unit. This process is illustrated in FIG. 19. The method starts in the Booting state 1900. If the switch is in the "off" position, the method transitions into the Wireless Disabled state 1902. The system can only exit this state if the CMU 108 is rebooted, in which case the method goes back to the Booting state 1900. However, if the switch is in the "on" position while the method is in the Booting state 1900, the method transitions into the Wireless Enabled state 1904, in which the wireless communication is enabled. In this state, if the switch is set into the "off" position, the method transitions into the Wireless Disabled state 1902.

[Propulsion Assembly Location Identification]

Figure 22:
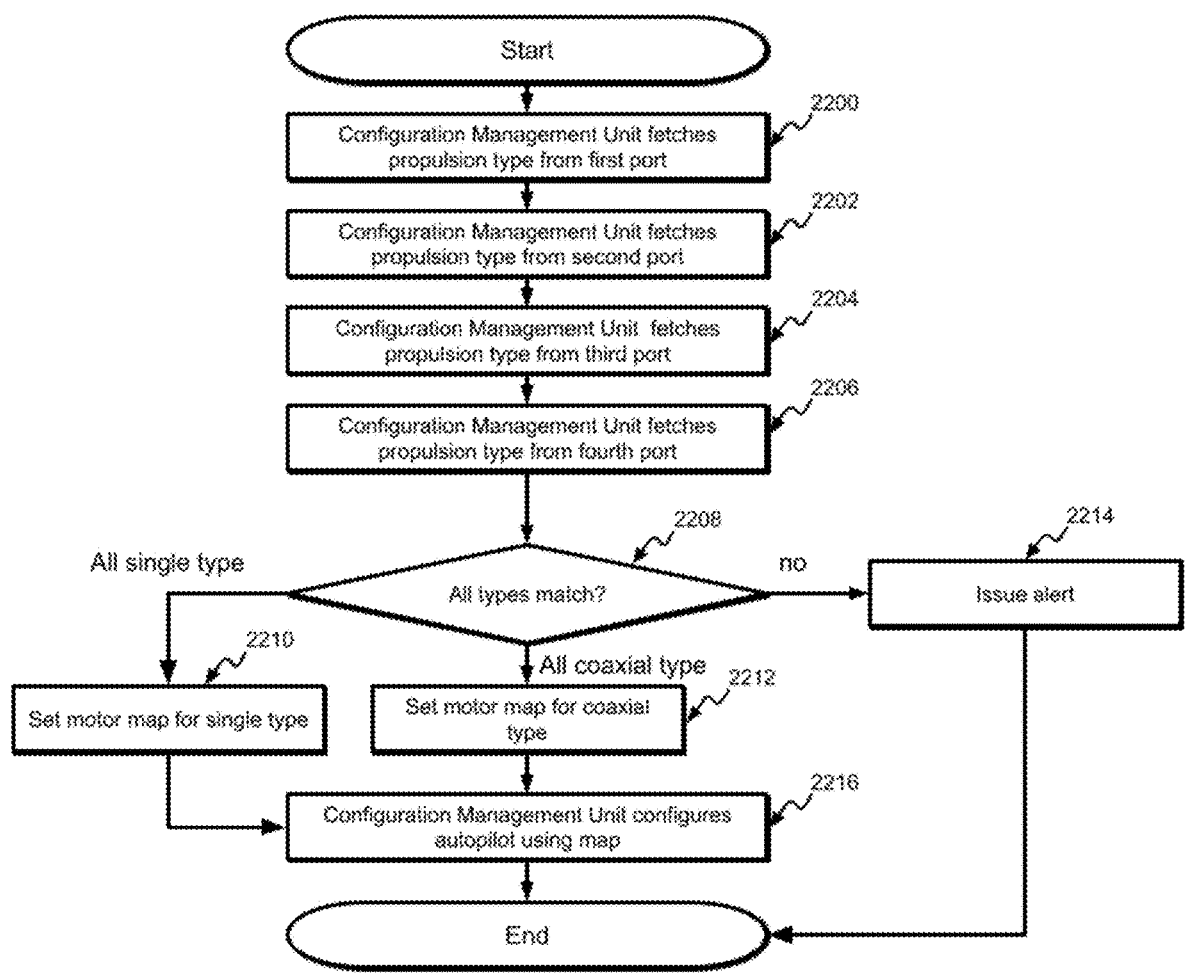
FIG. 22 is a chart showing method of checking ports to detect Propulsion Assemblies and setting a motor map based on the detected assemblies.

In one exemplary embodiment, the vehicle 100 is a multicopter drone that can be configured either as a quadcopter or a coaxial octocopter. The Configuration Management Unit 108 can detect the propulsion assemblies type and the location of each assembly 102. This information is recorded in a motor location map [FIG. 7 and FIG. 8]. FIG. 22 illustrates the method of setting the motor map. In step 2200, the Configuration Management Unit 108 fetches the propulsion type from the assembly connected to the first port. In step 2202, the Configuration Management Unit 108 fetches the propulsion type from the assembly connected to the second port. In step 2204, the Configuration Management Unit 108 fetches the propulsion type from the assembly connected to the third port. In step 2206, the Configuration Management Unit 108 fetches the propulsion type from the assembly connected to the fourth port. In step 2208, the Configuration Management Unit 108 verifies if all the propulsion types match. If the types do not match, the method proceeds to step 2214 in which an alert is issued and the method ends. If the types are all single motor types, the method proceeds to step 2210 and the Configuration Management Unit 108 sets up the motor map as a map for single motor type, similar to the map illustrated in FIG. 7. If the types are all coaxial motor types, the method proceeds to step 2212 and the Configuration Management Unit 108 sets up the motor map as a map for coaxial motor type, similar to the map illustrated in FIG. 8. Once the map has been set, via either step 2210 or step 2212, the Configuration Management Unit 108 configures the autopilot using the map (e.g. number of motors, pin assignment . . . )

Figure 9:
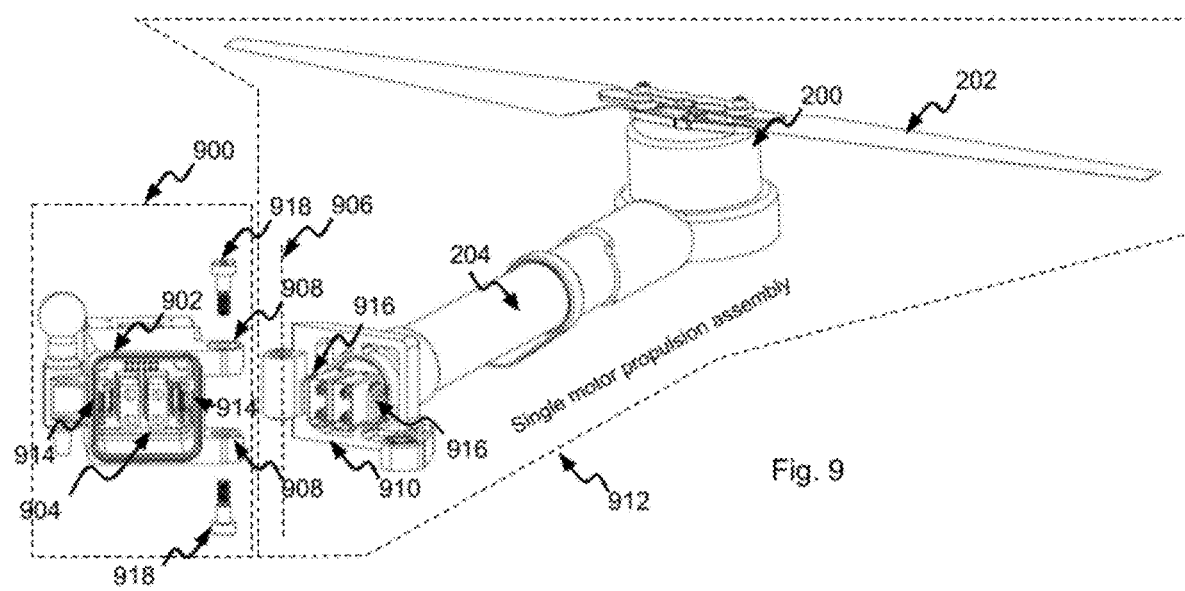
FIG. 9 is a 3D schematic of a single motor Propulsion Assembly and a vehicle mount.

The invention, as illustrated in FIG. 9, features a specially designed Arm Bracket Receptacle 900 which is mounted rigidly to the drone frame. The receptacle 900 is hollow and may be made of 6061-T6 aluminum or an ABS/PA6 type of Plastic with glass fiber reinforcement. Inside of it is mounted a PCB which contains four connectors. These connectors will mate with the four connectors that are attached to propulsion assemblies 300. In this instance, a propulsion assembly 300 contains one or more motors 200, one or more motor mounts, one or more propellers 202, one mounting carbon fiber tube/boom 204, a PCB for the assembly 102 memory and a specially designed tube clamp which is the same dimensions as the Arm 204 Bracket Receptacle. At the end of the tube are four connectors—opposite polarities to those connectors, which are mounted on the PCB inside the Arm 204 Bracket Receptacle.

Figure 10:
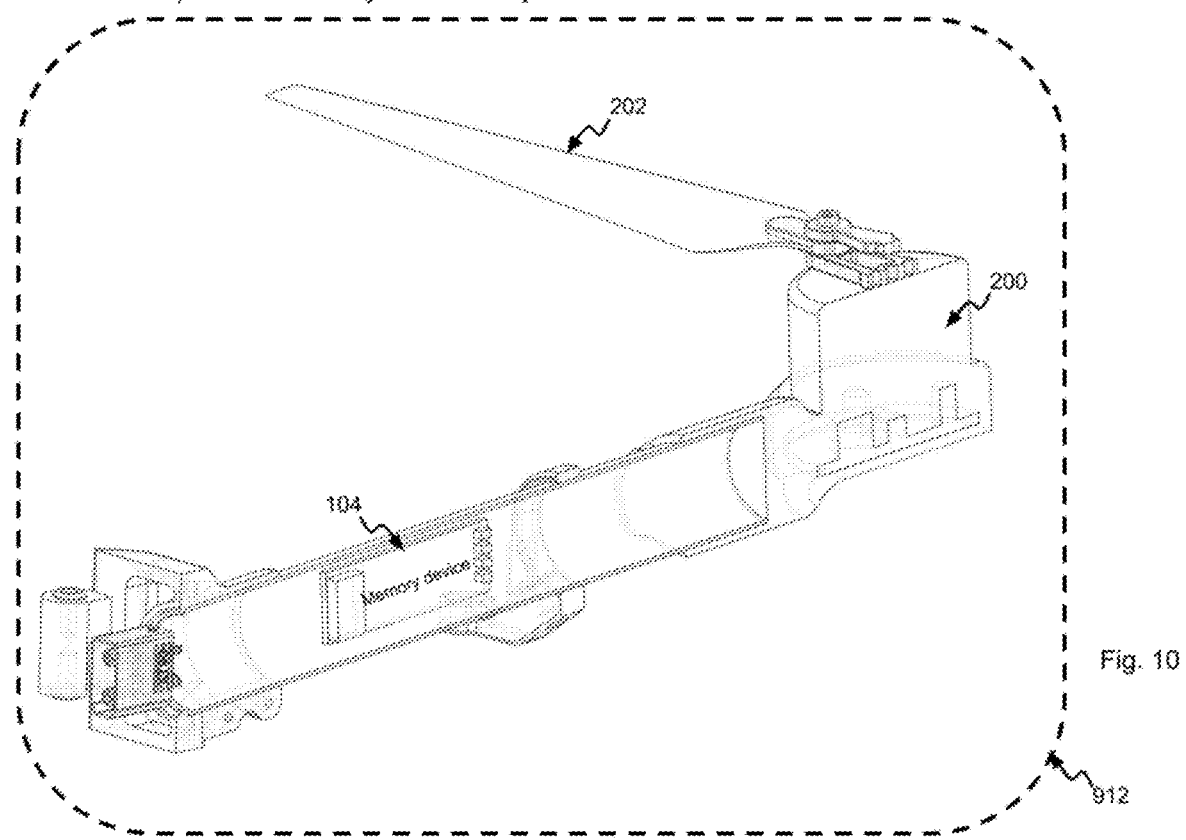
FIG. 10 is a perspective cross-sectional view a Propulsion Assembly showing a possible location of a Memory device within.

The connectors are to permit power, motor control signals for each motor 200, and relevant Propulsion ID information to be exchanged from the Memory Device 104 in the propulsion assembly, as illustrated in FIG. 10, to the Configuration Management Unit 108. The connector pinouts are as follows:

Arm Bracket Receptacle 900 Side: Two male high current connectors 904, which send the battery 210 voltage straight to each motor 200. Both connectors 904 are in parallel, so it does not matter which connector is plugged into the other (on the propulsion system side).

Two female low current connectors 914 which contain PWM (or similar motor control signals) and Propulsion ID information. These connectors 914 are also in parallel, so it does not matter which connector is plugged into the other (on the propulsion system side).

Propulsion Assembly Side: Two female high current connectors 910, which send the battery voltage straight to each motor 200. Both connectors are in parallel, so it does not matter which connector is plugged into the other (on the Arm Bracket Receptacle 900 side.)

Two male low current connectors 916 which provide control signals and Propulsion ID information.

Once the connection is made, the internal wire routing as done in a board-to-board connection sends the PWM and propulsion ID information straight to the Configuration Management Unit 108. The power wires then go separately to a separate High Current PCB, which is connected to the flight battery 210($s$).

The Arm Bracket Receptacle 900 also features a specially machined o-ring gland 902 which allows a standard circular o-ring to be pressed into the gland 902, to allow a water-tight fit when the arm 204 closes. This allows the drone 100 to have removable parts, but also remain watertight for Ingress Protection (IP) ratings of 54 and higher.

In addition, the arm 204 bracket also features four radial ball bearings 918 on the pivot axis for a precision fit.

When a user wishes to install a new propulsion system, the user simply inserts the propulsion assembly 300 and aligns the threaded pivot axis 906 inside of the four ball bearings 908. At this time, two stainless steel shouldered screws 908 are inserted to secure the Arm Bracket Receptacle 900 to the propulsion assembly 300—one on top and one on bottom. Once the two bolts are secured, the propulsion system may be freely opened or closed. This provides ease of use both in the field and during storage. Wires are then installed between the arm 204 and the vehicle 100 to connect the power connectors and both of the PWM/Propulsion ID connectors.

The connectors are preferably plugged in or removed only when a new propulsion system is inserted, not every time the drone 100 is folded or unfolded for flight, transport or storage. This allows the drone 100 to be both easily transported while also not exposing the connectors to the wear and tear of being plugged/unplugged every time the drone 100 must be assembled/disassembled for flight from storage.

In an alternative method, the connectors can be plugged in or removed each time the drone 100 is folded or unfolded.

In order to remove that particular propulsion system the user performs the steps in reverse.

[Center Frame 206 is an Assembly—Memory Device is in the Configuration Management Unit]

The center frame 206 is the central assembly that constitutes the center platform of the vehicle 100. In the case of a multicopter, the central frame is the assembly 102 to which the other assemblies 102 are attached. The autopilot 106 and Configuration Management Unit 108 are mounted on the center frame 206. In the case of the center frame 206 assembly, the memory device 104 is part of the Configuration Management Unit 108. In other words, the memory of the Configuration Management Unit 108 is used to store the assembly data (Assembly ID, flight time, etc.) for the center frame 206.

In an alternative embodiment, the center frame 206 has its own memory device 104 for the assembly information.

[Logging]

In one embodiment, the present invention includes a logging feature. This logging feature is located on the Configuration Management Unit 108. Upon a triggering event the logging feature starts recording vehicle configuration and telemetry data until a certain end event. This configuration and telemetry data is stored in CMU Log files 114.

For example, the triggering event could be a signal indicating that the boot procedure is complete, a vehicle arm 204ing event, a PWM signal, a logging start signal sent from the App 112, a certain battery 210 current level. An example end event may be a disarm 204ing event, a certain current level, an end signal sent by the App 112.

One important aspect of the invention is that the assemblies' unique IDs, from the assemblies' memory devices 104 are recorded in the CMU Log files 114. This allows the operator to look up this data for further use such as internal workflow or for showing operation data to flight authorities, such as the FAA, CAA, etc.

The CMU Log files 114 contain one or more, preferably all, of: date, time, flight time, starting remaining battery 210 capacity (charge level), end remaining battery 210 capacity (charge level), assembly ID1, assembly ID2, assembly ID3, assembly ID4, propulsion type, other equipment assembly IDs, configuration data, geolocalisation data. The user can use the App 112 to configure the data elements that are logged by the Configuration Management Unit 108.

The remaining battery 210 capacity/charge level can be directly determined by the Configuration Management Unit 108 through sensors, including one or more of voltage and current sensors. Alternatively, the remaining battery 210 capacity/charge level can be communicated by the autopilot 106 to the Configuration Management Unit 108.

In one embodiment, the Configuration Management Unit 108 records the assembly IDs and the determined vehicle propulsion type directly in the CMU Log files 114 or alongside the logs. For example, details of a flight including flight time, location, battery 210 type, and determined propulsion type may be recorded in the AP Log files 116 from the autopilot 106 and CMU Log Files 114 from the Configuration Management Unit 108 and stored in the Configuration Management Unit 108.

In an alternative preferred embodiment, the Configuration Management Unit 108 maintains its own logs and keeps a mapping of the autopilot 106's AP Log files 116 and Configuration Management Unit 108 CMU Log Files 114, such that a user can then view both logs for a certain flight.

[Sharing Logs with Manufacturer—Storing Logs on the Cloud 120]

The present invention allows sharing the logs with the manufacturer. This allows the user to save logs 114 and 116 on a remote server for safekeeping. This also allows the manufacturer to get statistics on the use of the assemblies 102 by customers. The user can decide what type of information is to be shared with the manufacturer and what type of information is to be stored on the manufacturer's cloud 120. The user may opt to store all or a portion of the assembly data on the cloud 120. The user may also opt to share all or a portion of the assembly data with the manufacturer. The App 112 provides the user with a menu to select the assembly data that is stored on the cloud 120 and the assembly data that is shared with the manufacturer.

Figure 23:
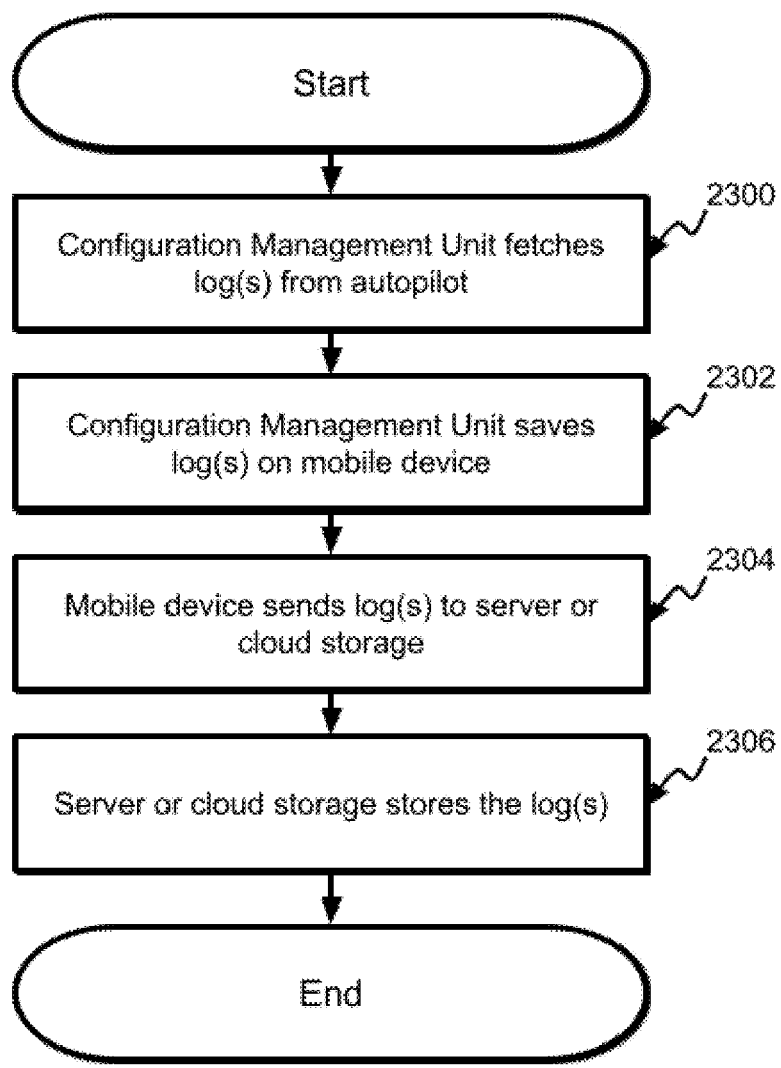
FIG. 23 is a chart showing a method of storing logs in a server or cloud storage.

FIG. 23 illustrates a method of storing logs in cloud storage. First, the Configuration Management Unit 108 fetches logs from the autopilot (step 2300). Periodically, or each time the App 112 is connected to the Configuration Management Unit 108, the App 112 downloads one or both logs 114 and 116 from the Configuration Management Unit 108 (step 2302).

Periodically or each time the App 112 is online, the App 112 sends the logs to the manufacturer and to the cloud 120 (step 2304). The logs are then stored on the server or cloud (step 2306).

The user can download the stored assembly data from the cloud 120 via a web interface. The web interface allows the user to visualize the user's assembly data stored on the cloud 120.

[Storing Firmware and Parameters in the Cloud]

Figure 24:
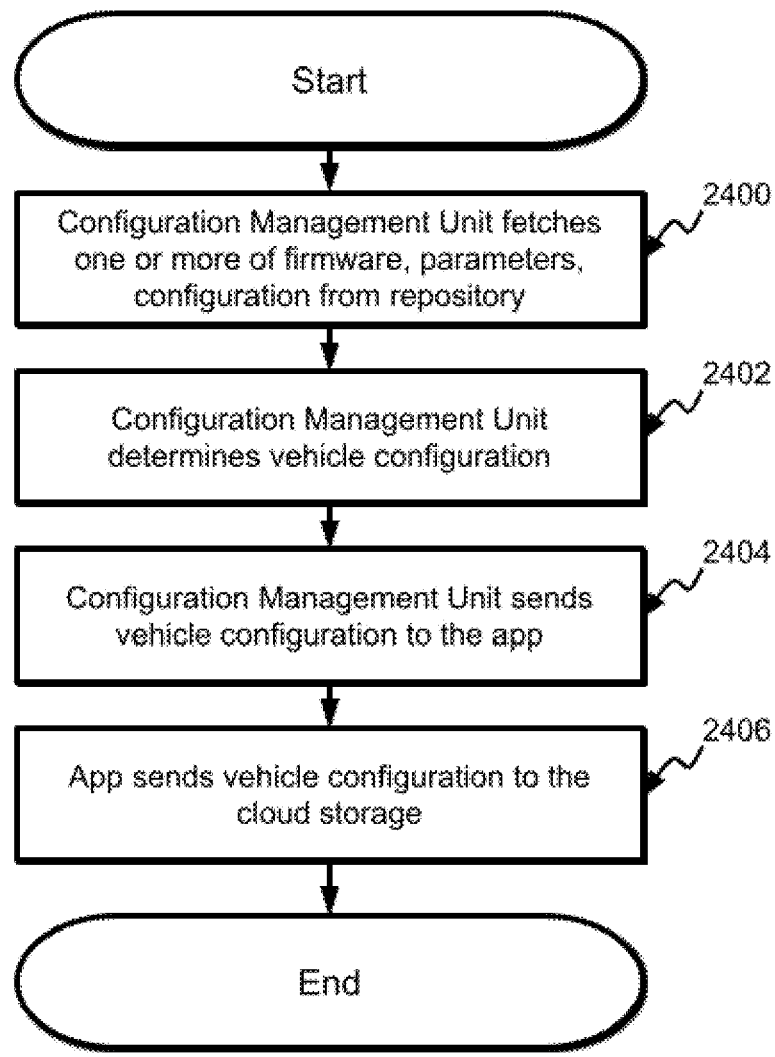
FIG. 24 is a chart showing a method of storing Vehicle Configuration in the cloud.

One feature of the invention is the possibility of storing the downloaded firmware, parameters and configuration files to a cloud storage 120. FIG. 24 illustrates the method for this feature. In step 2400 The Configuration Management Unit 108 fetches one or more firmware, parameter and configuration data from the repository 118. In step 2402 the Configuration Management Unit 108 determines the vehicle's configuration using the methods of this invention to detect and set the configuration using assembly data and user input. In step 2404, the Configuration Management Unit 108 sends the vehicle configuration to App 112. In turn, in step 2406, App 112 sends the vehicle configuration to the cloud storage 120.

[Maintenance Indicator]

The present invention also includes a maintenance indicator. The maintenance indicator's function is to tell a user that a maintenance service is required. For example, once a certain amount of flight time has been reached on an assembly 102, as recorded in the assembly 102's memory device 104, or in the Configuration Management Unit 108, the maintenance indicator goes off.

In one embodiment of the invention, the maintenance indicator is a light, such as an LED light, on the vehicle 100. This light is turned on by the Configuration Management Unit 108 when a maintenance operation is required.

Further, the App 112 also displays an App maintenance indicator. The maintenance information is relayed to the App 112 via the wireless communication means from the Configuration Management Unit 108. The maintenance indicator in the App 112 provides additional information to the user such that the user may know the kind of maintenance operation that is to be performed. For example, the user may need to perform an inspection of a propulsion assembly 300, or replace a whole assembly 102. One example message may read: "Your propulsion system has reached hh hours, time to change out (or inspect) the xyz component".

Another example is the situation that arises when for example one or more of a drone 100's propulsion assembly 300 has been replaced. The different assemblies 102 mounted on the vehicle 100 now have different flight times. Without the invention, the user would struggle to know which propulsion system needs to be replaced sooner. However, since the Configuration Management Unit 108 knows the individual flight times of each assembly 102, the user can be informed in time of suggested or required maintenance or replacement of the assemblies 102.

[IDs and Types]

Possible types of assemblies 102 include propulsion assemblies 300, energy assemblies, and accessory assemblies.

Propulsion assemblies 300 comprise assemblies 102 that provide motion to the vehicle 100, such as arms 204 with motors 200.

Energy assemblies can be battery 210 assemblies, fuel assemblies or such. Battery 210 assemblies typically include one or more LiPo batteries 210 or similar and a memory device 104. The memory device 104 contains data that indicates the battery 210 assembly type such that the autopilot 106 can be configured accordingly. For example, the battery 210 type information allows the Configuration Management Unit 108 to set the battery 210 capacity, voltage and conversion parameters in the autopilot 106. A fuel assembly indicates the fuel type (gasoline, hydrogen, etc. . . . ) and fuel tank capacity and other assembly information including flight time, manufacturing date, and assembly ID.

Accessory assemblies are assemblies that are related to payload or additional features. These accessory assemblies comprise items such as retractable landing gears, payload drop boxes, cameras, gimbals, spray devices, megaphones and the like.

[Landing Gear]

A drone 100's landing gear is another assembly that is compatible with the Configuration Management Unit 108. The Configuration Management Unit 108 can query the memory device 104 in the landing gear to determine the landing gear type and configure the autopilot 106 accordingly, including the type of communication type to control the landing gear and the pins or bus that the landing gear is connected to.

[App 112 Configuration Based on Detected Assemblies]

Not only does the Configuration Management Unit 108 configure the autopilot 106, it also sends assembly ID and type information to App 112 in order to activate features in App 112.

For example, if the Configuration Management Unit 108 detects an agricultural spraying assembly, the App 112 will be displaying information to the user to indicate how to operate the spray unit.

[Switch Channel Configuration]

The Configuration Management Unit 108 can use the assembly information to configure the autopilot 106 with the appropriate input channel mappings. For example, if the Configuration Management Unit 108 detects that a camera assembly or a spray assembly is attached to the vehicle 100, it will send parameters to the autopilot 106 such that the RC controller switches are mapped according to the manufacturer's default, that enable triggering the accessory.

[Soft Reboot]

In some cases, the autopilot 106 may need to reboot to read the parameters once they have been changed by the Configuration Management Unit 108. In this case, the Configuration Management Unit 108 can send a signal to the autopilot 106 to reboot.

[Detected Assemblies Sent to App]

Periodically, the Configuration Management Unit 108 sends a list of detected assembly IDs and related information stored in the memory device 104 to the App 112. The App 112 then displays this list to the user. This way, the user can verify that all the desired equipment has been mounted on the vehicle 100 and detected by the Configuration Management Unit 108. The App 112 also uses this list to activate related features within the App 112. For instance, the App 112 may present a parameter tuning menu that allows the user to tune the parameters for one of the mounted assemblies 102. In another example, the App 112 may present user instructions or alerts that correspond to the detected assembly 102.

[Vehicle 100 Information Displayed Based on Detected Assemblies]

Figure 25:
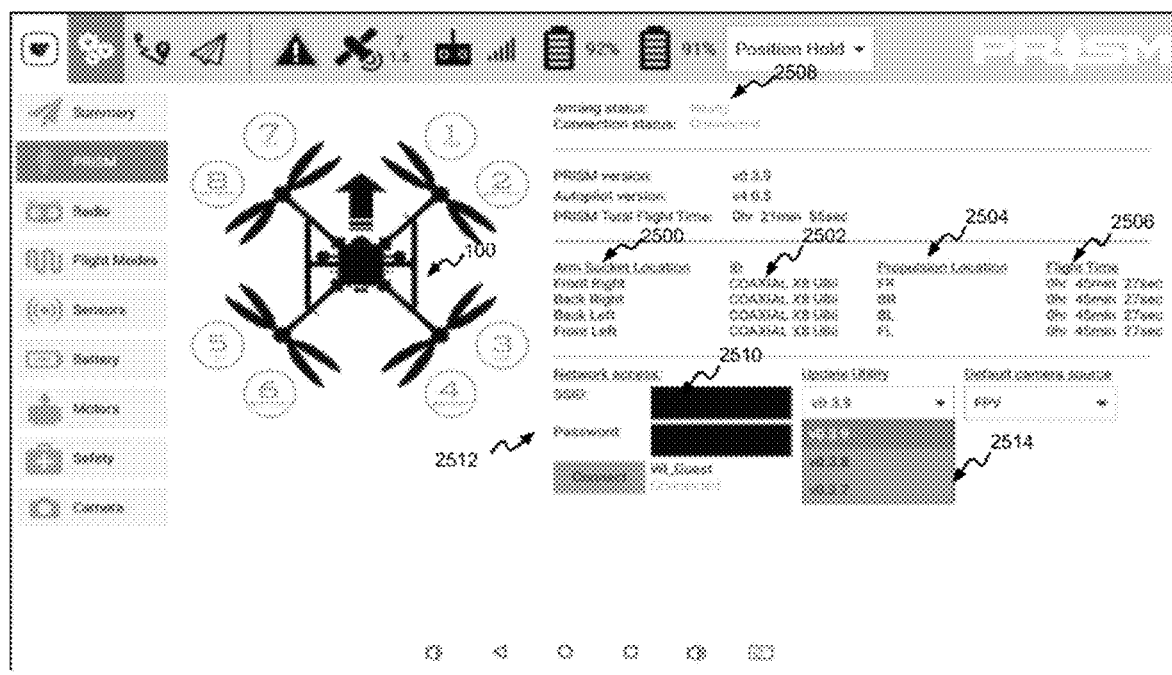
FIG. 25 is an exemplary display screen in accordance with the invention displaying a model of the Vehicle in coaxial configuration and Assembly Information.

FIG. 25 depicts a screen of the App 112 that displays the detected configuration of the vehicle 100. Vehicle 100's orientation is indicated using an arrow that points outwards, from the front of the drone 100. Motor numbers are indicated on the diagram. This particular screen shows that the vehicle 100 is configured in coaxial X8 mode. That is to say, the drone 100 has 8 motors 200, two on each of four booms 204. The screen shows the arm socket location 2500 of each detected propulsion assembly 300, their propulsion type 2502, their intended propulsion location 2504 and their flight times 2506. In this particular example, in arm socket location 2500 Front Right, the Configuration Management Unit 108 has detected and reported a propulsion assembly 300 with a coaxial X8 U8ii propulsion ID 2502 with FR (Front Right) intended location 2504 with a flight time 2506 of 45 min and 27 sec. The Back Right, Back Left and Front Left arm sockets also have matching propulsion assemblies 300 BR, BL and FL, all of propulsion type COAXIAL X8 U8ii.

The App 112 indicates that the drone 100 is ready to arm 2508. This results in part from the Configuration Management Unit 108, or alternatively the App 112, having detected that the combination of the four propulsion assemblies 300 is valid and that other conditions have been met to allow the drone 100 to arm. For example, if there were Coaxial and Quad propulsion assemblies 300 present at the same time, the system would determine that the vehicle 100 is not ready to arm, as this is not a valid configuration.

The screen further presents a section that allows the operator to check for updates and to update the vehicle 100 with newer parameters. The operator may enter the Wifi's SSID 2510 and password 2512 in order for the vehicle 100's Configuration Management Unit 108 to fetch updates 2514.

Figure 26:
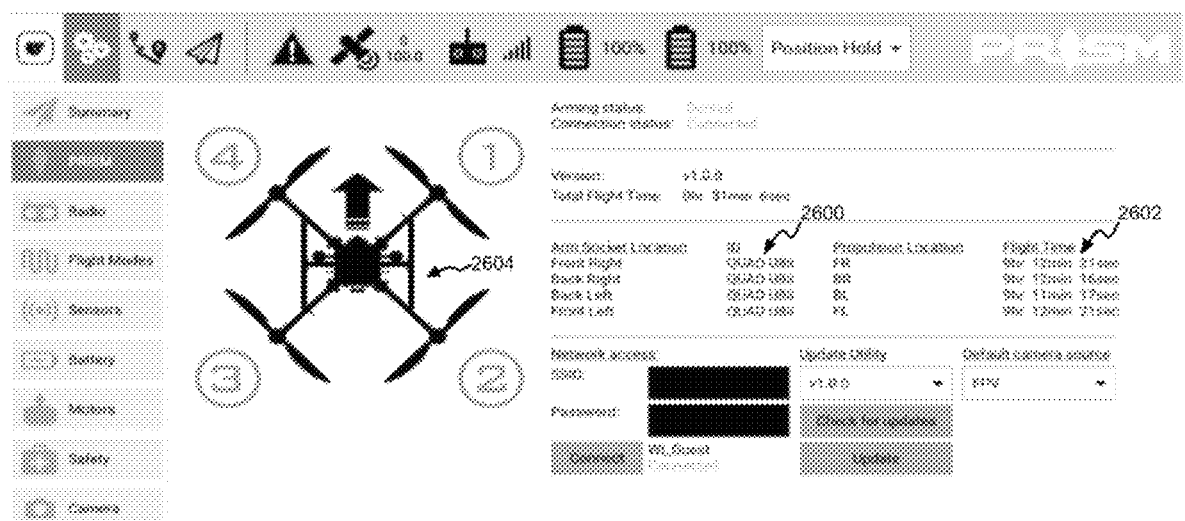
FIG. 26 is an exemplary display screen in accordance with the invention displaying a model of the Vehicle in quadcopter configuration and Assembly Information.

FIG. 26 depicts a screen showing the drone 100 in quadcopter configuration, that is four booms 204 with one motor 200 per arm 204. In this example, each propulsion assembly 300 is detected as having a QUAD U8ii propulsion ID 2600. They have similar flight times 2606, around 9 hours, 12 mins and 18 seconds.

The vehicle diagram 2604 that is displayed on the screen of FIG. 26 is automatically chosen to correspond to the detected vehicle configuration.

Figure 27:
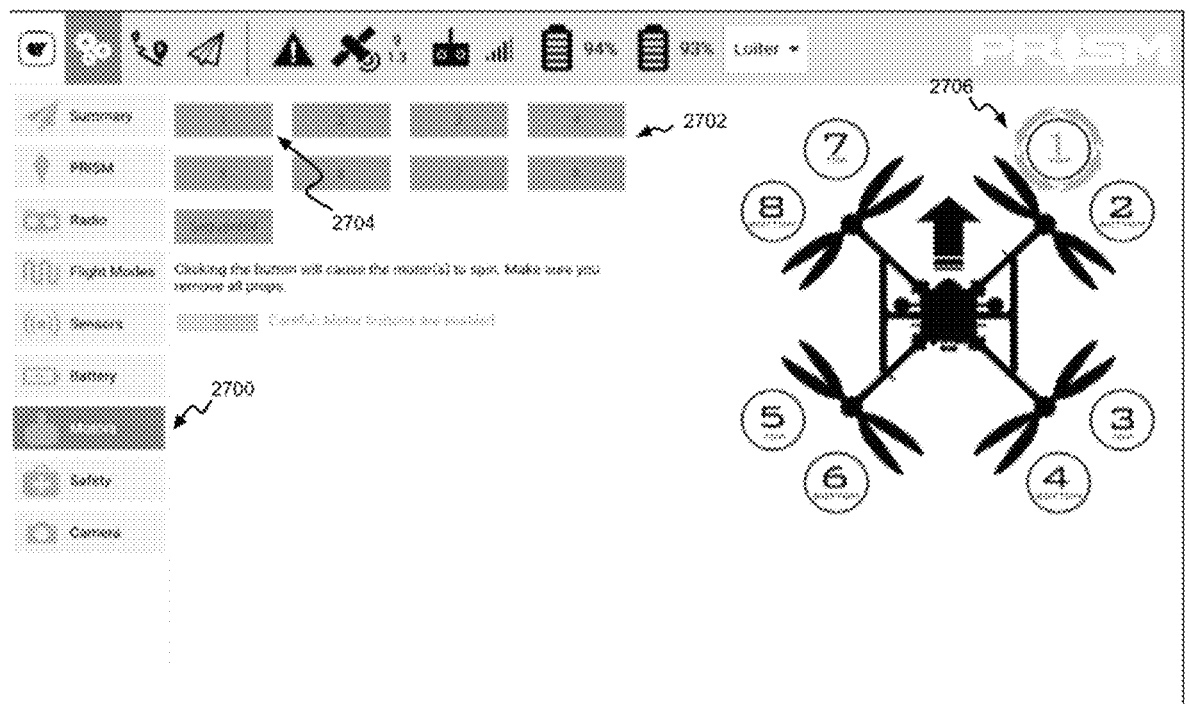
FIG. 27 is an exemplary display screen in accordance with the invention displaying a motor test page.

FIG. 27 shows a screen of the ground control station application related to motor testing 2700. This screen will show a number of motors 200 that correspond to the propulsion assemblies 300 that were detected by the Configuration Management Unit 108. If four quad propulsion types are detected, the screen will show four motors 200. However, if four coaxial propulsion types are detected, the screen will show eight motors 200. Other propulsion configuration and motor 200 numbers may be detected and presented.

This screen allows a user to test each motor 200 individually by clicking or pressing on a motor 200 button in the list of buttons 2702 that corresponds to the motor 200 number depicted in the vehicle diagram, here presented on the right side. This diagram depends on the configuration that was detected by the Configuration Management Unit 108. When the button is clicked or pressed, the vehicle 100 will perform an action on the corresponding motor 200. This could be a control signal causing the motor 200 to emit a noise, a light indicator on the propulsion assembly 300, or as in the preferred embodiment, a signal to spin the corresponding motor 200 slowly either continuously, or for a predetermined short period of time or for as long as the user holds the button engaged. This allows the user to verify that the motor 200 is in the expected position. For example, if the user presses or clicks the button 2704 corresponding to motor one, in the coaxial configuration, the top motor 200 on the front right propulsion assembly 300 should spin in the counterclockwise rotation 2706. Any other behavior would indicate that the vehicle 100 has not been configured properly.

The invention claimed is:

1. An automatically configured vehicular system comprising:
   (a) an aerial vehicle;
   (b) a vehicle controller on said aerial vehicle;
   (c) a configuration management unit running on a processor on said aerial vehicle; and
   (d) a plurality of assemblies attached to said aerial vehicle;
   wherein said vehicle controller controls said aerial vehicle;
   wherein each assembly of the plurality of assemblies comprises at least one component and a memory device;
   wherein manufacturing data, comprising one or more of a manufacturing date, a manufacturing technician, and a manufacturing location, is recorded in the memory device;
   wherein a unique identifier is recorded in the memory device;
   wherein an assembly type identifier is recorded in the memory device;
   wherein the configuration management unit determines an assembly type of each assembly of the plurality of assemblies based on the assembly type identifier of the assembly;
   wherein said plurality of assemblies includes at least four propulsion assemblies, wherein said propulsion assemblies additionally comprise a propulsion component;
   wherein the configuration management unit determines whether the aerial vehicle is configured as a quadcopter or whether the aerial vehicle is configured as a coaxial octocopter, or whether the aerial vehicle is misconfigured based on the assembly type information of the propulsion assemblies attached to the aerial vehicle;
   wherein the configuration management unit determines that the aerial vehicle is configured as a coaxial octocopter if four of the attached propulsion assemblies are determined to be coaxial assemblies according to the assembly type information recorded in their memory devices;
   wherein the configuration management unit determines that the aerial vehicle is misconfigured if less than four of the attached propulsion assemblies are determined to be of the same assembly type according to the assembly type information recorded in their memory devices;
   wherein the configuration management unit determines that the aerial vehicle is misconfigured if less than four propulsion assemblies are detected;
   wherein if the configuration management unit determines that the aerial vehicle is misconfigured, the vehicle controller is prevented from arming;
   wherein said configuration management unit automatically configures said vehicle controller by reading information recorded in one or more of said assemblies' memory devices and determining configuration information to be used to configure the vehicle controller, based at least in part on the information from the assemblies;
   wherein the configuration management unit uses the determined configuration information to automatically configure said vehicle controller such that the vehicle controllers controls operations are affected by said configuration information;
   wherein gain values associated with the attached plurality of assemblies are automatically configured into the flight controller by the configuration management unit based on information recorded in the memory device of the attached assemblies;
   wherein the configuration management unit determines if one or more additional assemblies of the plurality of assemblies are attached to the aerial vehicle, the one or more additional assemblies being at least one of:
   a propulsion assembly,
   an energy assembly,
   a landing gear assembly, or
   an accessory assembly,
   wherein if the configuration management unit determines that the one or more additional assemblies of the plurality of assemblies is attached to the aerial vehicle, the configuration management further automatically configures the vehicle controller based on information in the one or more additional assemblies of the plurality of assemblies;
   wherein the information in the additional one or more assembly is used by the vehicle controller to control either the aerial vehicle, the assembly, or both the aerial vehicle and the assembly;
   wherein the configuration management unit accumulates flight time on at least one of the assemblies by recording new flight time in the at least one of the assemblies' memory.

2. The system of claim 1, wherein said aerial vehicle is an unmanned vehicle and said vehicle controller is an autopilot.

3. The system of claim 1, wherein the configuration management unity accumulates flight time by reading a flight time recorded in the at least one of the assemblies, adding time that the aerial vehicle has been in flight since the last time that flight time was accumulated and recording the accumulated flight time in the at least one of the assemblies' memory.

4. The system of claim 1, wherein the configuration management unit may also effectively prohibit operation of the aerial vehicle based on said detected configuration.

5. The system of claim 4, wherein the system is capable of detecting when a configuration of assemblies attached to the aerial vehicle is invalid based on the absence of propulsion assemblies or the mismatch of assembly types of two or more of the propulsion assemblies.

6. The system of claim 5, wherein an alert is issued if the configuration management unit detects that a configuration of assemblies attached to the aerial vehicle is invalid.

7. The system of claim 4, wherein said configuration management unit configures said aerial vehicle with vehicle configuration data.

8. The system of claim 7, wherein said configuration management unit fetches said vehicle configuration data from a repository via a wireless communication link and wherein said vehicle configuration data comprise parameters and updates, wherein said fetching comprises:
  requesting, by the configuration management unit, said vehicle configuration data to repository;
  requesting from the repository said parameters and updates.

9. The system of claim 7 wherein said vehicle configuration data comprise one or more of:
  motor gains,
  flight gains,
  number of motors,
  motor ports,
  motor test instructions,
  total battery capacity,
  equipment configuration,
  RC channels,
  GPS settings,
  telemetry settings,
  altimeter gains,
  retractable landing gear configuration,
  a firmware,
  ESC calibration data, and
  GPS calibration data.

10. The system of claim 7, further comprising:
  a mobile device which is in wireless communication with the configuration management unit;
  said system further comprising an app, wherein said app runs on said mobile device.

11. The system of claim 10, wherein said app features one or more menus and displays vehicle information based on said detected vehicle configuration.

12. The system of claim 11, wherein said menus include one or both of:
  a graphical representation of said aerial vehicle; and
  a textual item that indicates said assemblies attached to said vehicle and information about whether said assemblies are mismatched.

13. The system of claim 11, wherein said app communicates an instruction to said configuration management unit to request said vehicle configuration data from a remote repository and wherein said configuration management unit receives said vehicle configuration data from said remote repository.

14. The system of claim 11, wherein said app displays one or more of:
  aircraft flight hours;
  individual propulsion ID,
  individual assembly flight hours,
  propulsion type for each propulsion assembly,
  propulsion type mismatch alert,
  a guide on how to calibrate ESCs,
  additional information provided by said configuration management unit,
  a motor calibration page, and
  a motor calibration button.

15. The system of claim 10, wherein said app sends firmware updates to said configuration management unit.

16. The system of claim 10, wherein said app features a motor test menu, wherein said motor test menu's contents depends on said attached assemblies.

17. The system of claim 1, wherein said configuration management unit configures said vehicle controller with parameters and settings corresponding to said assembly type identifier of the detected propulsion assemblies.

18. The system of claim 1, wherein said configuration management unit configures said aerial vehicle by setting configuration data that correspond to the detected vehicle configuration in said vehicle controller.

19. The system of claim 18, wherein the aerial vehicle is configured as a quadcopter when the configuration management unit detects that the four propulsion assemblies are of single motor type and wherein the aerial vehicle is configured as a coaxial copter when the configuration management unit detects that the four propulsion assemblies are of coaxial motor type.

20. The system of claim 1, wherein a user can interchange assemblies by detaching one or more said attached assemblies from said aerial vehicle and attaching one or more other assemblies to said aerial vehicle.

21. The system of claim 1, wherein one or more of said plurality of assemblies is an accessory assembly, said accessory assembly being identified with an accessory ID.

22. The system of claim 1, wherein said memory device includes tracked data, such that said tracked data follows said assembly when said assembly is attached to another vehicle, such tracked data including one or more of:
  flight time,
  distance flown,
  number of power cycles,
  maximum power used by the assembly,
  max temperature of the assembly, and
  ownership of the assembly.

23. The system of claim 22, wherein said flight time data accumulates based on at least one of:
  whether the aerial vehicle to which said assembly is attached to is in operation;
  whether the aerial vehicle to which said assembly is attached to is armed; and
  whether the aerial vehicle to which said assembly is attached to is off the ground.

24. The system of claim 1, wherein said gain values are motor gain values.

25. The system of claim 1, wherein said gain values are provided by the manufacturer.

26. A method of automatically configuring a vehicular system,
  wherein the vehicular system comprises:
    (a) an aerial vehicle;
    (b) a vehicle controller on said aerial vehicle;
    (c) a configuration management unit running on a processor on said aerial vehicle; and
    (d) a plurality of assemblies attached to said aerial vehicle;
  wherein the method comprises:
    reading information from the plurality of assemblies attached to said aerial vehicle, wherein the information is recorded on a memory device within each assembly of the plurality of assemblies;
    detecting a vehicle configuration based on said information;
  wherein each assembly further comprises at least one component;

wherein manufacturing data comprising one or more of a manufacturing date, a manufacturing technician, and a manufacturing location, is recorded in the memory device;
wherein a unique identifier is recorded in the memory device;
wherein an assembly type identifier is recorded in the memory device;
wherein the configuration management unit determines an assembly type of each assembly of the plurality of assemblies based on the assembly type identifier of the assembly;
wherein said plurality of assemblies includes at least four propulsion assemblies, wherein said propulsion assemblies additionally comprise a propulsion component;
wherein the method further comprises determining, by the configuration management unit, whether the aerial vehicle is configured as a quadcopter or whether the aerial vehicle is configured as a coaxial octocopter, or whether the aerial vehicle is misconfigured based on the assembly type information of the propulsion assemblies attached to the aerial vehicle;
  wherein the configuration management unit determines that the aerial vehicle is configured as a coaxial octocopter if four of the attached propulsion assemblies are determined to be coaxial assemblies according to the assembly type information recorded in their memory devices;
  wherein the configuration management unit determines that the aerial vehicle is misconfigured if less than four of the attached propulsion assemblies are determined to be of the same assembly type according to the assembly type information recorded in their memory devices;
  wherein the configuration management unit determines that the aerial vehicle is misconfigured if less than four propulsion assemblies are detected;
preventing the vehicle controller from arming if the configuration management unit determines that the aerial vehicle is misconfigured;
automatically configuring, by the configuration management unit said vehicle controller by reading information recorded in one or more of said assemblies' memory devices and determining configuration information to be used to configure the vehicle controller, based at least in part on the information from the assemblies;
automatically configuring, by the configuration management unit and based on the determined configuration information, said vehicle controller such that the vehicle controller's controls operations are affected by said configuration information;
automatically configuring, by the configuration management unit, gain values associated with the plurality of attached assemblies based on information recorded in the memory device of the attached assemblies;
determining, by the configuration management unit, if one or more additional assemblies of the plurality of assemblies are attached to the aerial vehicle, the one or more additional assemblies being at least one of:
a propulsion assembly,
an energy assembly,
a landing gear assembly, or
an accessory assembly,
  wherein if the configuration management unit determines that the one or more additional assemblies of the plurality of assemblies is attached to the aerial vehicle, the configuration management unit further automatically configures the vehicle controller using information in the one or more additional assemblies of the plurality of assemblies;
controlling, by the vehicle controller, either the aerial vehicle, the assembly, or both the aerial vehicle and the assembly based on the information in the additional one or more assembly;
accumulating, by the configuration management unit, flight time on at least one of the assemblies by recording new flight time in the at least one of the assemblies' memory.

27. The method of claim 26, further comprising:
configuring said aerial vehicle with configuration information from the one or more memory devices, wherein the information comprises one or more of:
motor gains,
flight gains,
number of motors,
motor ports,
motor test instructions,
total battery capacity,
equipment configuration,
RC channels,
GPS settings,
telemetry settings,
altimeter gains,
retractable landing gear configuration,
a firmware,
ESC calibration data, and
GPS calibration data.

28. The method of claim 26, further comprising featuring menus in an app which runs on a mobile device in wireless communication with the configuration management unit, wherein the content of the menus depends on the detected vehicle configuration and assembly information stored in the memory devices of the assemblies, wherein the content is one or more of:
aircraft flight hours,
individual propulsion ID numbers,
individual assembly flight hours,
propulsion type for each propulsion assembly,
propulsion type mismatch alert,
a guide on how to calibrate ESCs,
additional information provided by said configuration management unit,
a motor calibration page, and
a motor calibration button.

29. The method of claim 26, wherein said gain values are provided by the manufacturer.

30. A computer readable storage device, comprising instructions that when operatively executed by one or more computing devices cause a system to:
read information from a plurality of assemblies attached to an aerial vehicle, wherein the information is recorded on a memory device within each assembly of the plurality of assemblies;
detect a vehicle configuration based on the information; and
configure a vehicle controller on said aerial vehicle based on the detected vehicle configuration, such that the operations of the vehicle controller are automatically adjusted based on the detected vehicle configuration;
wherein each assembly further comprises at least one component;

wherein manufacturing data comprising one or more of a manufacturing date, a manufacturing technician, and a manufacturing location, is recorded in the memory device;

wherein a unique identifier is recorded in the memory device;

wherein an assembly type identifier is recorded in the memory device;

wherein a configuration management unit determines the assembly type based on the assembly type identifier of the assembly;

wherein said plurality of assemblies includes at least four propulsion assemblies, wherein said propulsion assemblies additionally comprise a propulsion component;

wherein the configuration management unit determines whether the aerial vehicle is configured as a quadcopter or whether the aerial vehicle is configured as a coaxial octocopter, or whether the aerial vehicle is misconfigured based on the assembly type information of the propulsion assemblies attached to the aerial vehicle;

wherein the configuration management unit determines that the aerial vehicle is configured as a coaxial octocopter if four of the attached propulsion assemblies are determined to be coaxial assemblies according to the assembly type information recorded in their memory devices;

wherein the configuration management unit determines that the aerial vehicle is misconfigured if less than four of the attached propulsion assemblies are determined to be of the same assembly type according to the assembly type information recorded in their memory devices;

wherein the configuration management unit determines that the aerial vehicle is misconfigured if less than four propulsion assemblies are detected;

wherein if the configuration management unit determines that the aerial vehicle is misconfigured, the vehicle controller is prevented from arming;

wherein said configuration management unit automatically configures said vehicle controller by reading information located in one or more of said assemblies' memory devices and determining configuration information to be used to configure the vehicle controller, based at least in part on the information from the assemblies;

wherein the configuration management unit uses the determined configuration information to automatically configure said vehicle controller such that the vehicle controllers controls operations are affected by said configuration information;

wherein gain values associated with the plurality of attached assemblies are automatically configured into the flight controller by the configuration management unit based on information recorded in the attached assemblies;

wherein the configuration management unit determines if one or more additional assemblies of the plurality of assemblies are attached to the aerial vehicle, the one or more additional assemblies being at least one of a propulsion assembly, an energy assembly, a landing gear assembly, or an accessory assembly, wherein if the configuration management unit determines that the one or more additional assemblies of the plurality of assemblies is attached to the aerial vehicle, the configuration management unit further automatically configures the vehicle controller using information in the one or more additional assemblies of the plurality of assemblies;

wherein the information in the additional one or more assembly is used by the vehicle controller to control either the aerial vehicle, the assembly, or both the aerial vehicle and the assembly;

wherein the configuration management unit accumulates flight time on at least one of the assemblies by recording new flight time in the at least one of the assemblies' memory.

31. The method of claim 30, wherein said gain values are provided by the manufacturer.

* * * * *